(12) United States Patent
Sugita

(10) Patent No.: US 9,207,442 B2
(45) Date of Patent: Dec. 8, 2015

(54) ZOOM LENS AND IMAGE PICKUP APPARATUS HAVING THE SAME

(71) Applicant: CANON KABUSHIKI KAISHA, Tokyo (JP)

(72) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 13/934,833

(22) Filed: Jul. 3, 2013

(65) Prior Publication Data

US 2014/0009668 A1   Jan. 9, 2014

(30) Foreign Application Priority Data

Jul. 9, 2012 (JP) ................................ 2012-153685

(51) Int. Cl.
 *G02B 15/22* (2006.01)
 *G02B 15/173* (2006.01)

(52) U.S. Cl.
 CPC ............ *G02B 15/22* (2013.01); *G02B 15/173* (2013.01)

(58) Field of Classification Search
 CPC ...... G02B 7/105; G02B 13/009; G02B 13/24; G02B 13/26; G02B 15/14; G02B 15/15; G02B 15/16; G02B 15/163; G02B 15/167; G02B 15/173; G02B 15/20; G02B 15/22; G02B 15/28

USPC ......... 359/676, 683, 684, 686, 687, 689, 690, 359/693, 705, 754, 755, 756, 757, 758

See application file for complete search history.

(56) References Cited

U.S. PATENT DOCUMENTS

2006/0268428 A1* 11/2006 Kuroda et al. ................ 359/693
2011/0116174 A1   5/2011 Suzuki et al.
2012/0057234 A1   3/2012 Li

FOREIGN PATENT DOCUMENTS

| CN | 102213823 A | 10/2011 |
|---|---|---|
| JP | 11352402 A | 12/1999 |
| JP | 2000047107 A | 2/2000 |

* cited by examiner

*Primary Examiner* — Scott J Sugarman
*Assistant Examiner* — Gary O'Neill
(74) *Attorney, Agent, or Firm* — Canon USA Inc., IP Division

(57) ABSTRACT

A zoom lens includes, a lens unit Lp having the highest positive refractive power, a lens unit Ln having negative refractive power, and a lens unit Lp2 having positive refractive power. In a first region, focusing from an infinite distance to a predetermined finite distance and zooming are able to be performed. In a second region in which macro driving is performed from a telephoto end to a macro end, two or more lens units are moved during macro driving so that the lens unit Lp is located closer to the object side than at a wide-angle end, a distance between the lens unit Lp and the lens unit Ln is larger at the macro end than at the wide-angle end, and a distance between the lens unit Ln and the lens unit Lp2 is smaller at the macro end than at the wide-angle end.

17 Claims, 25 Drawing Sheets

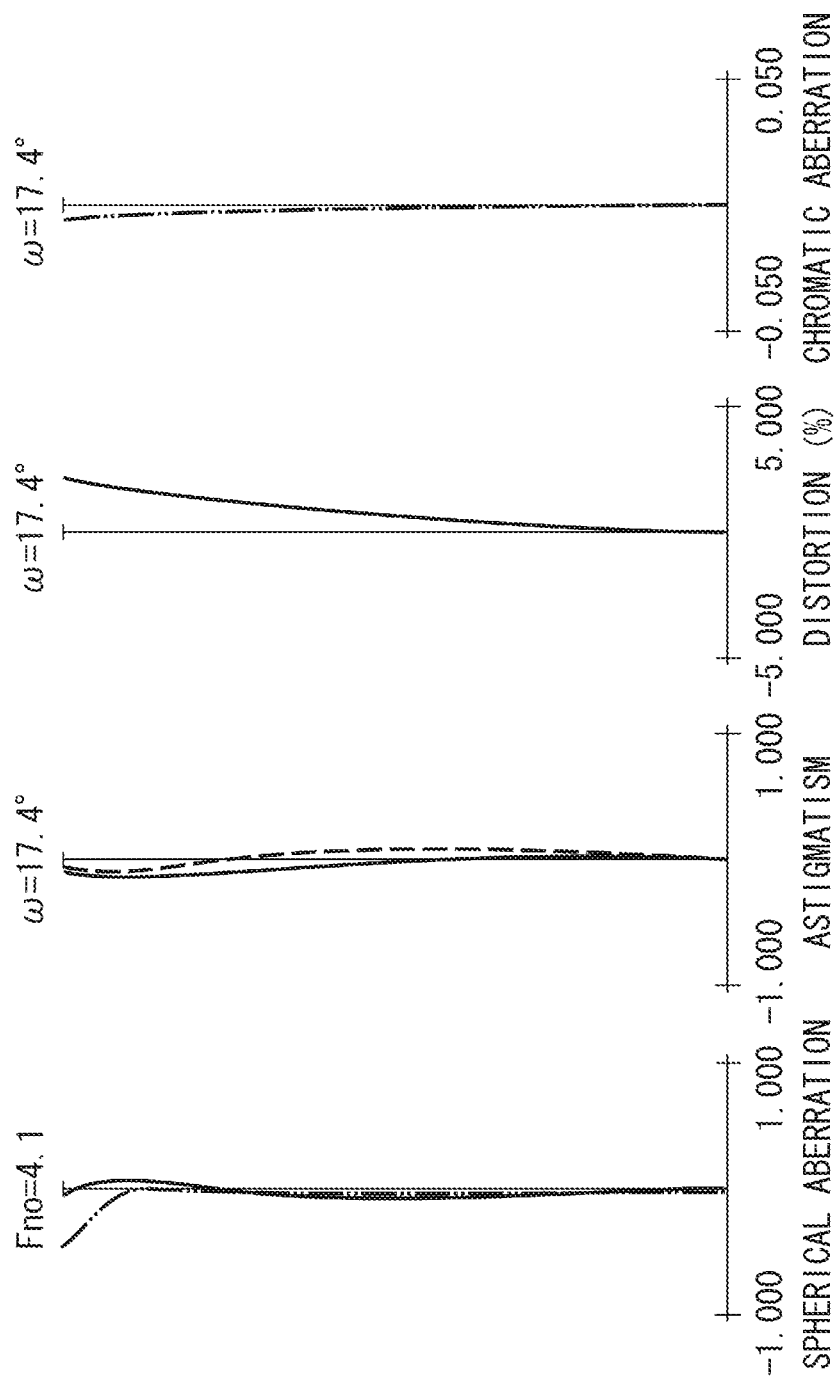

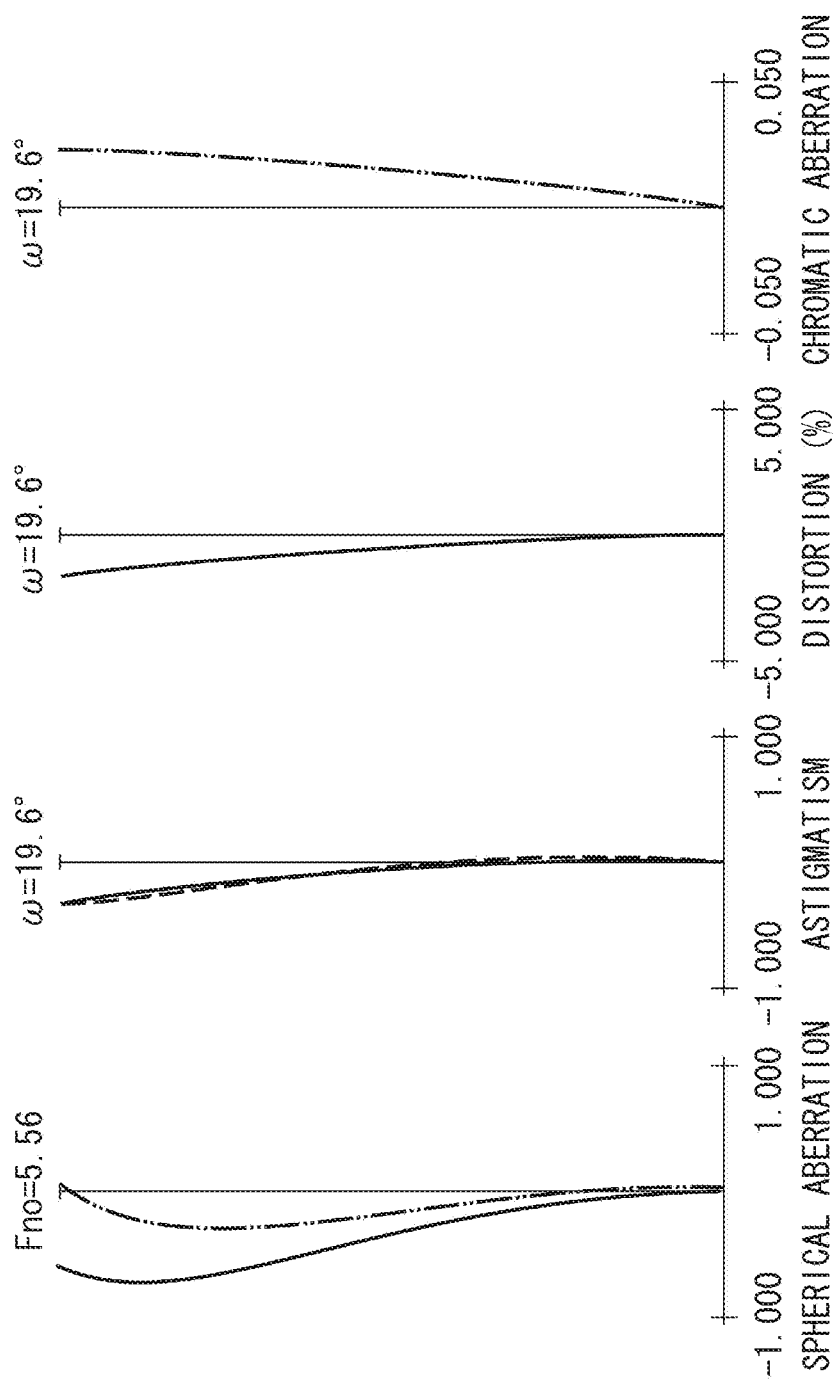

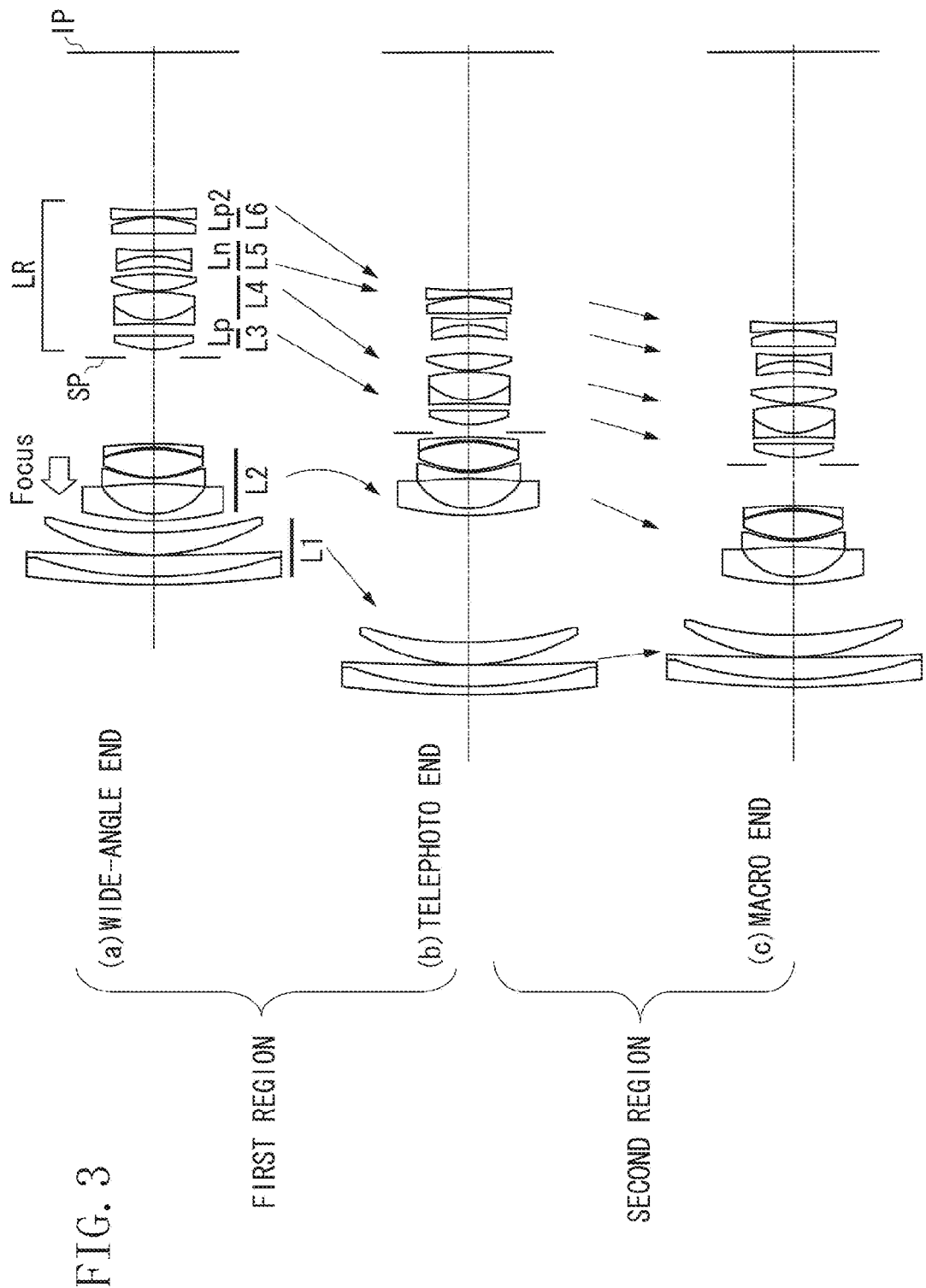

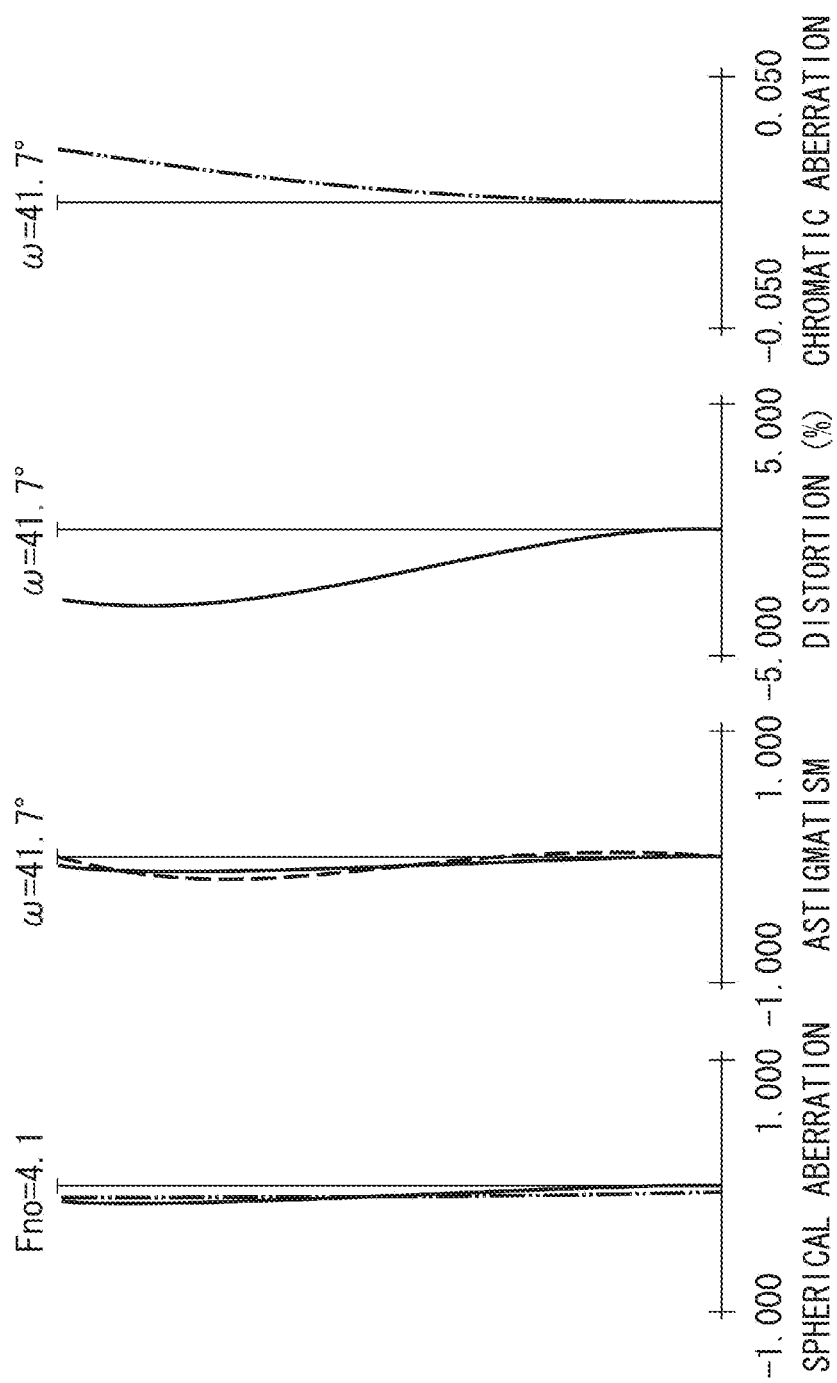

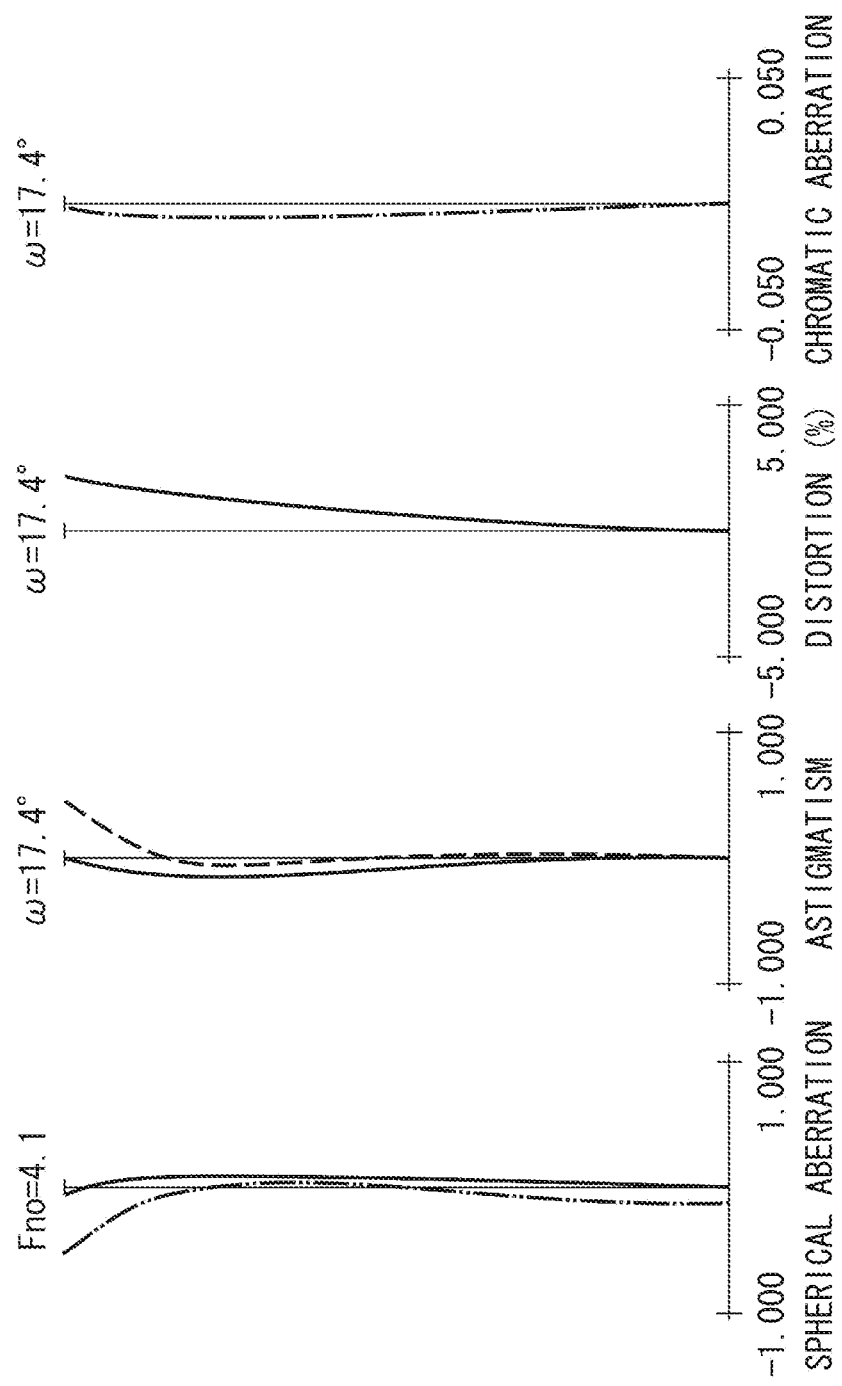

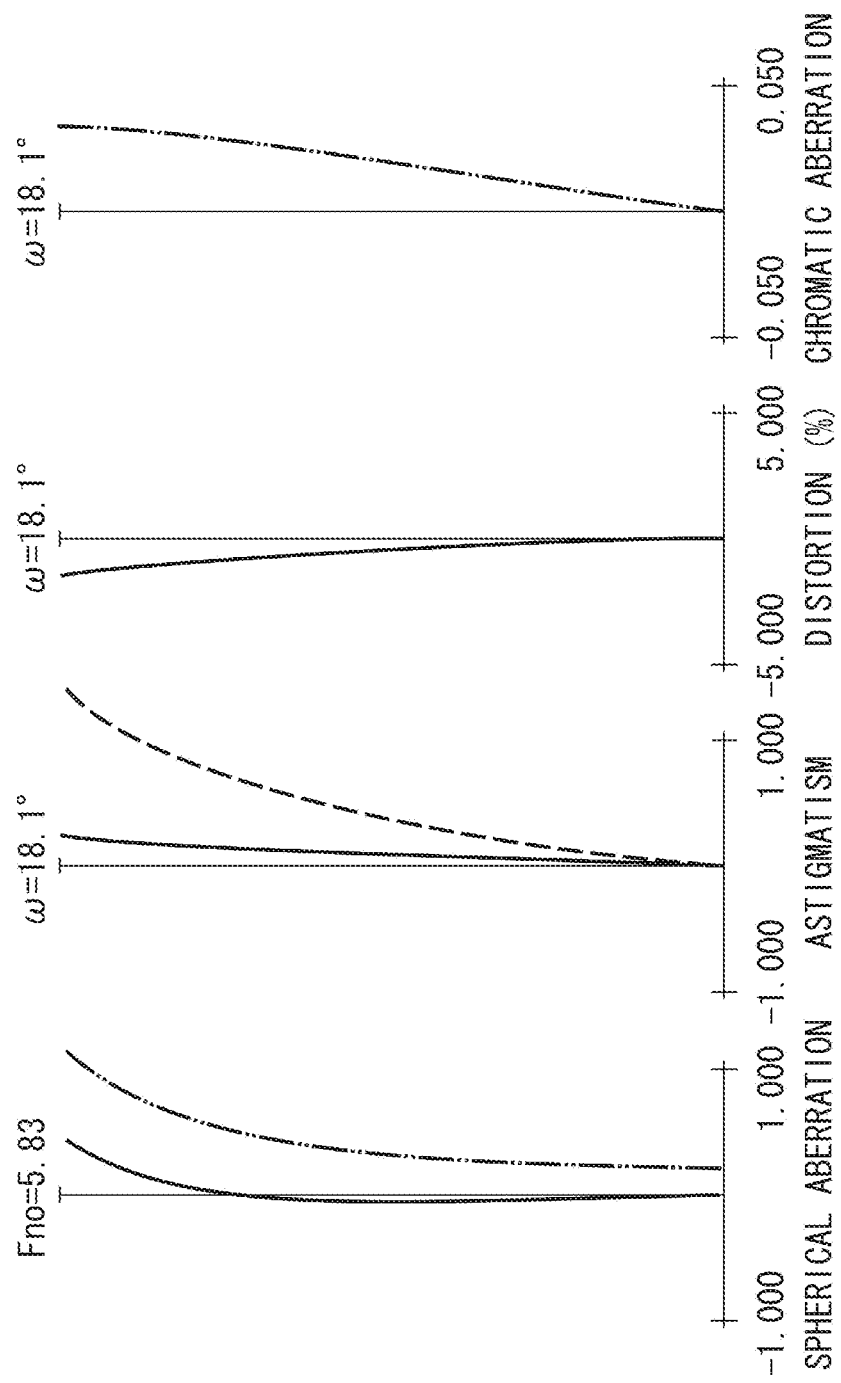

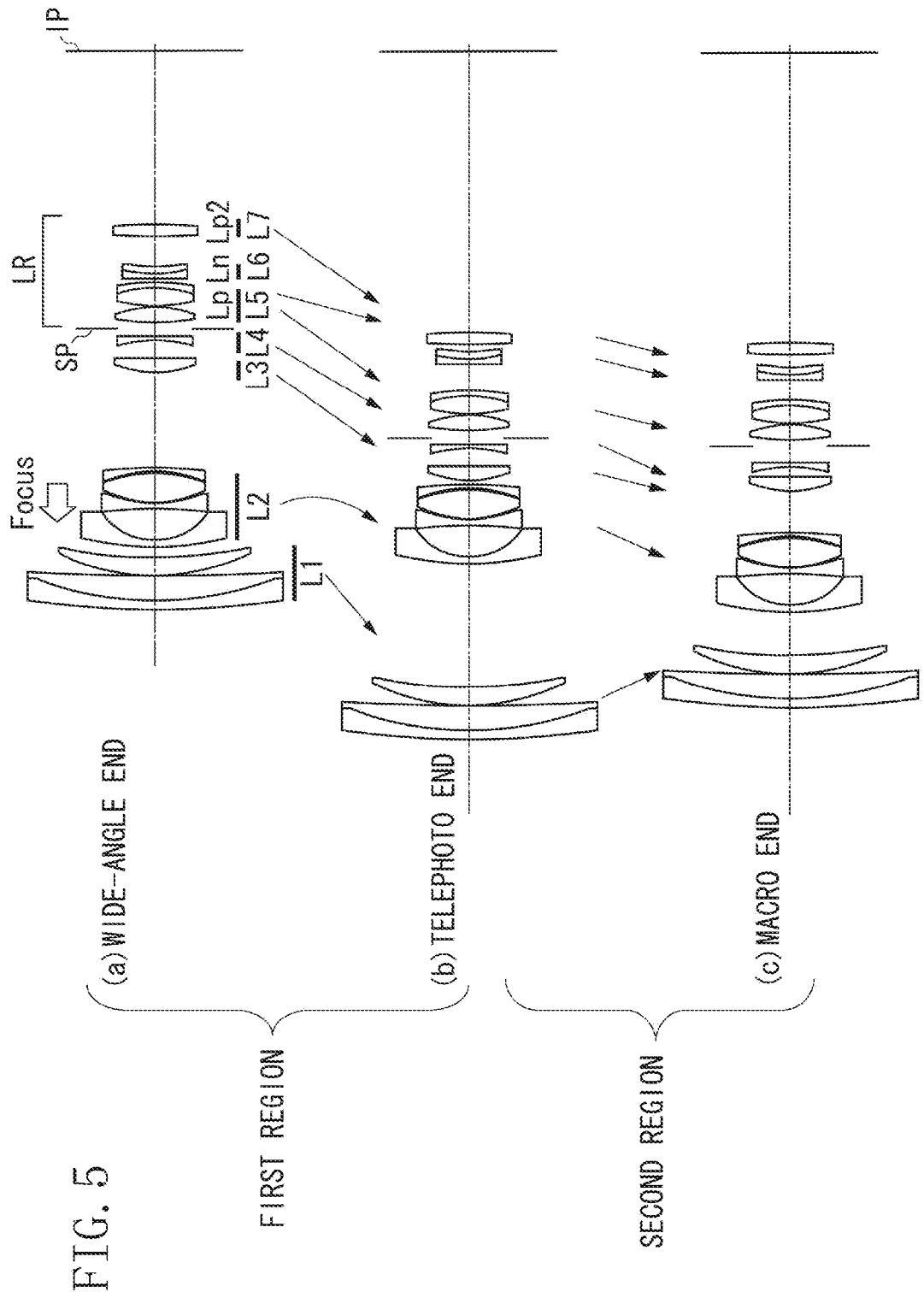

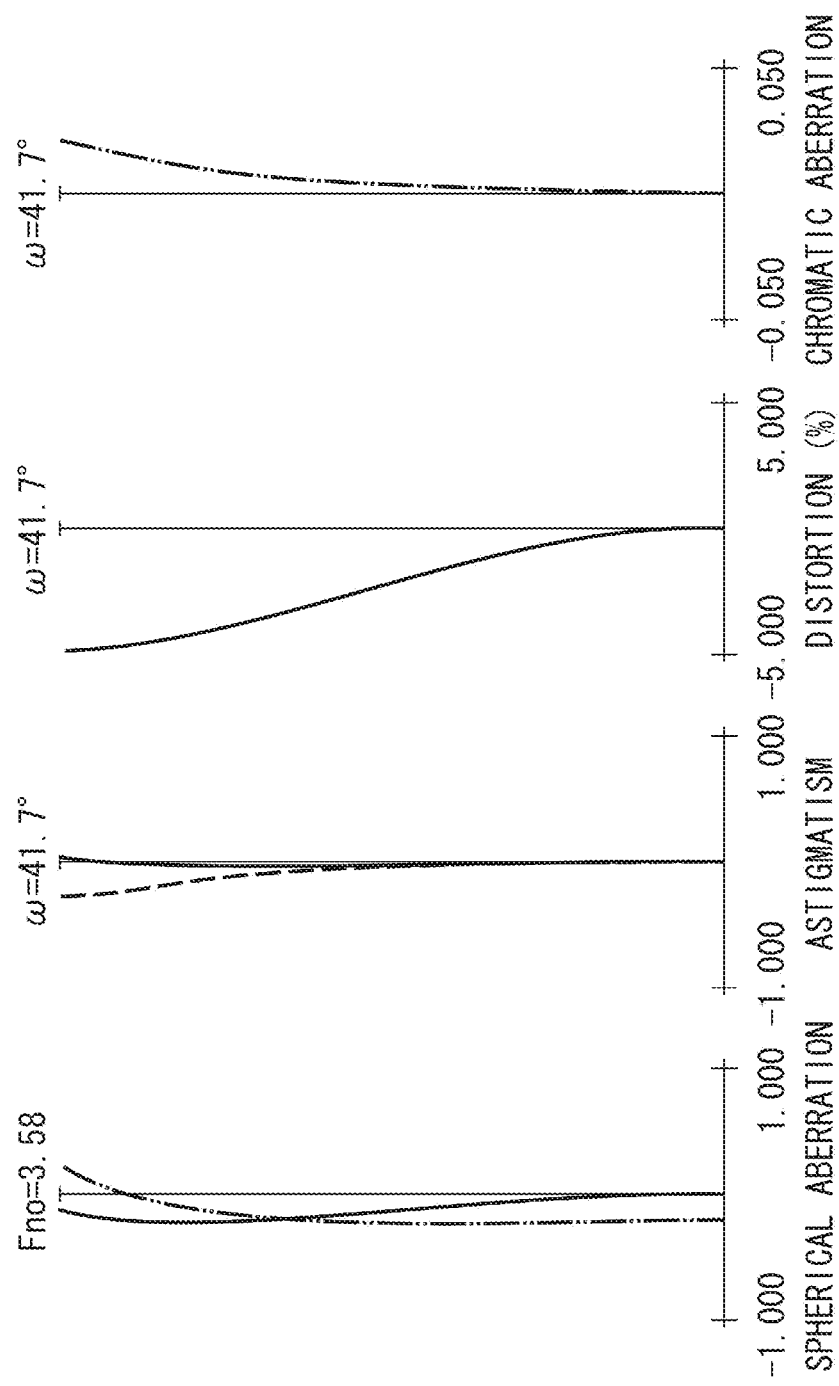

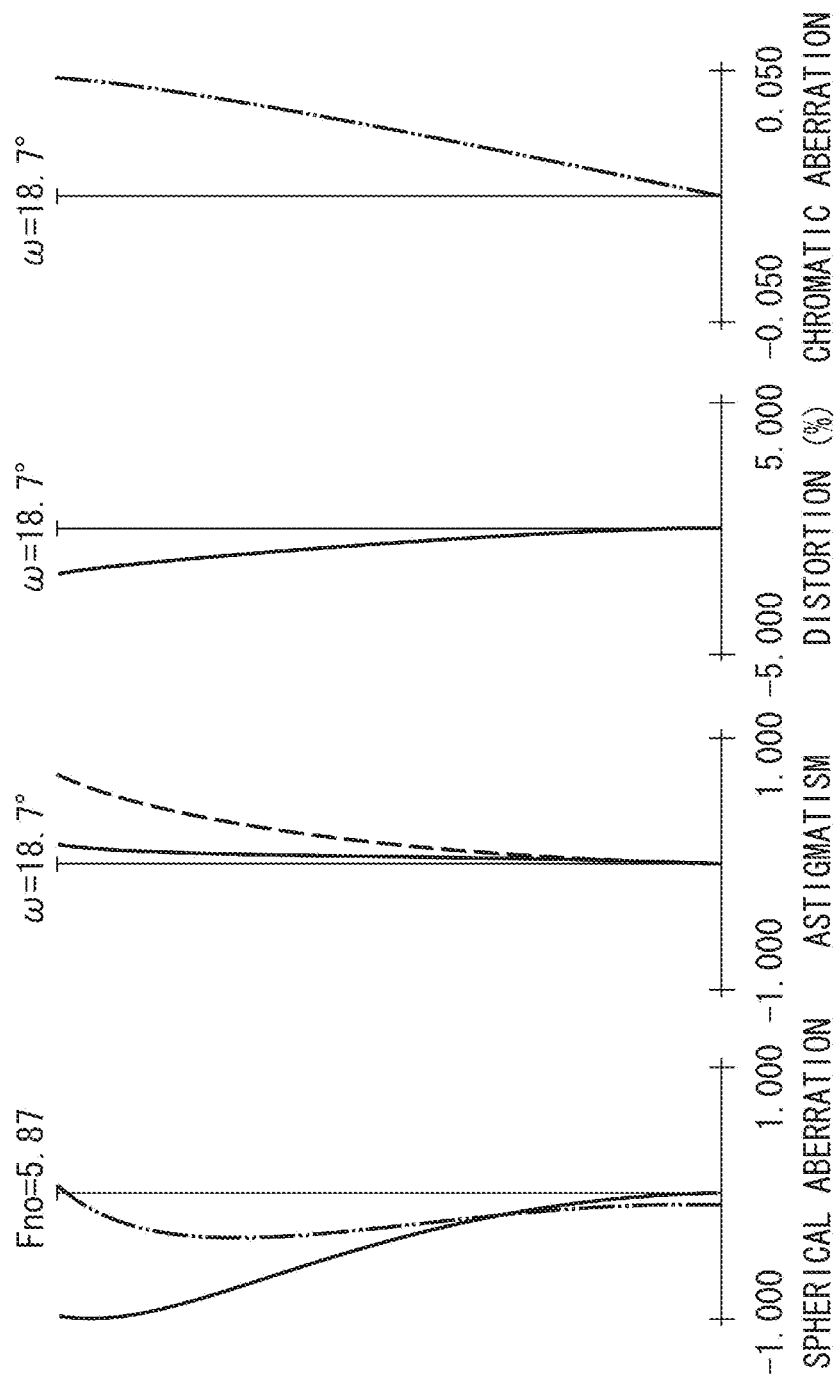

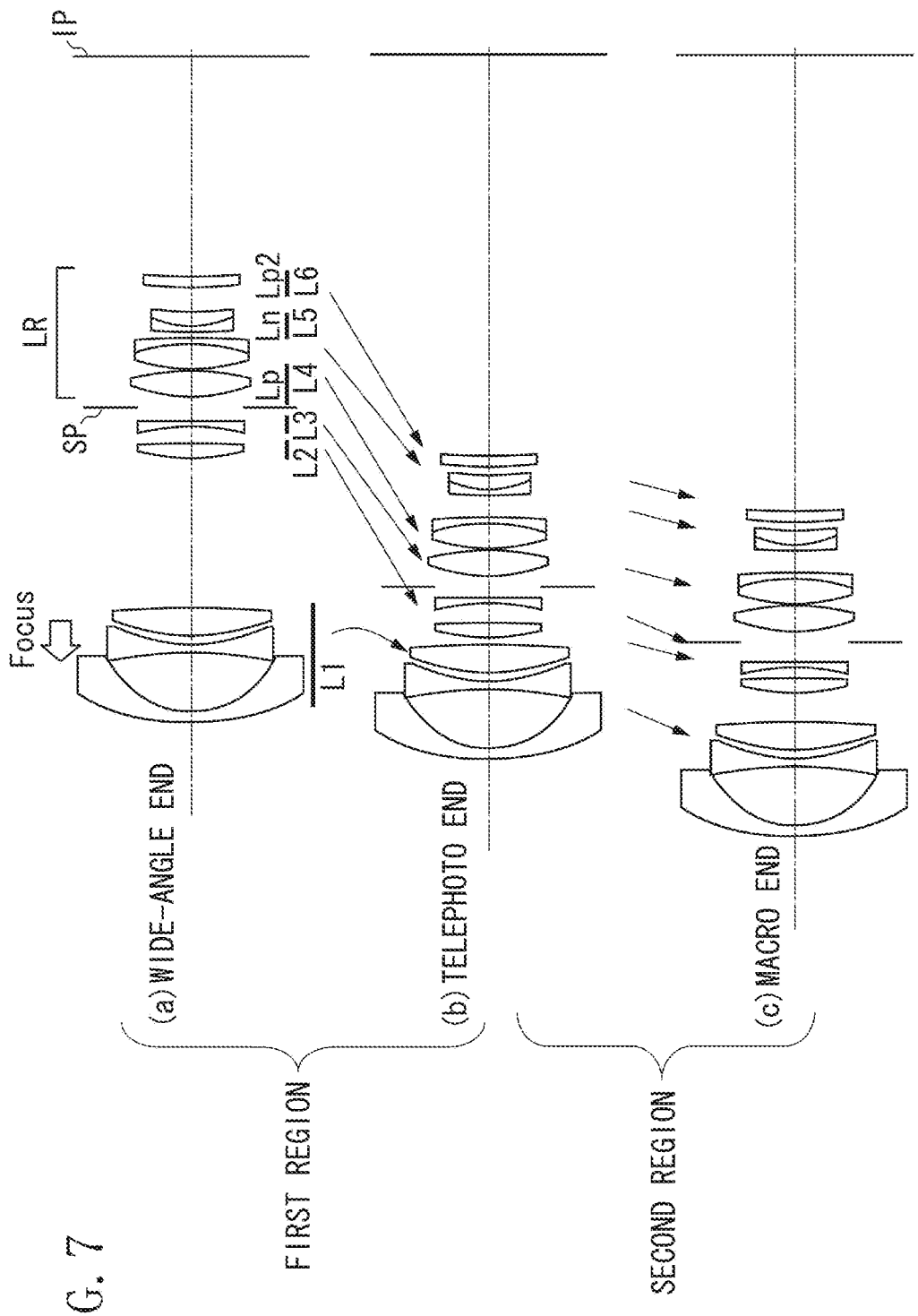

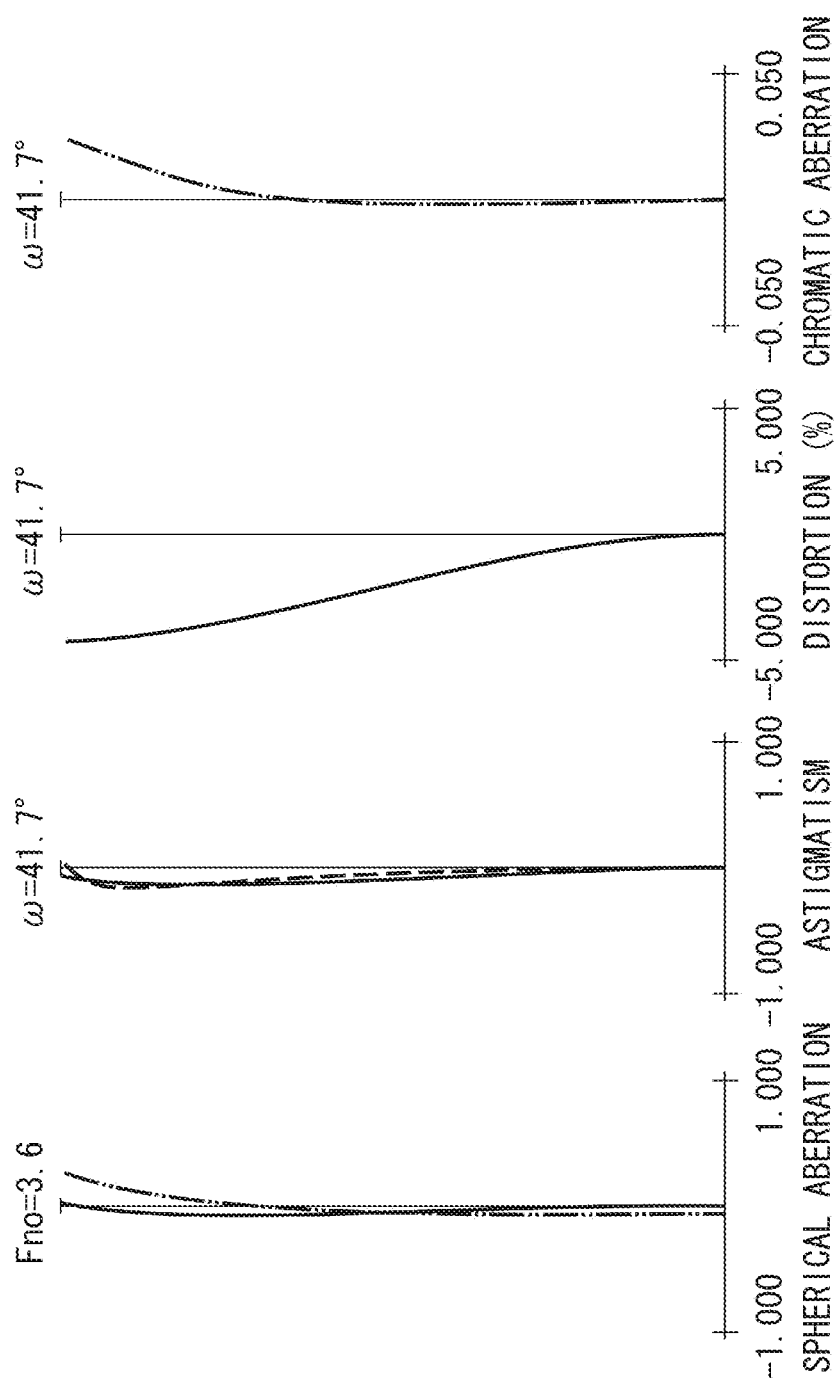

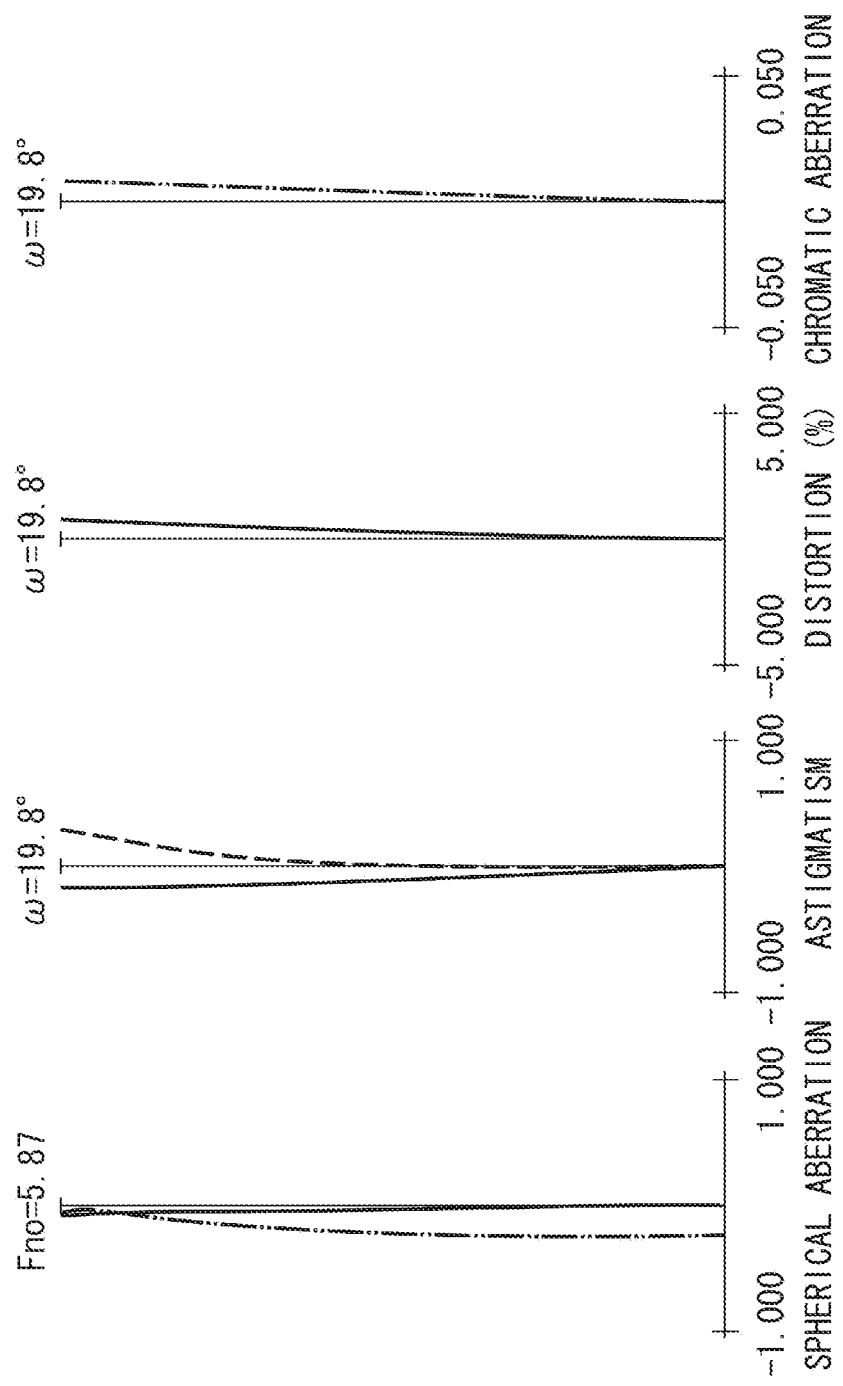

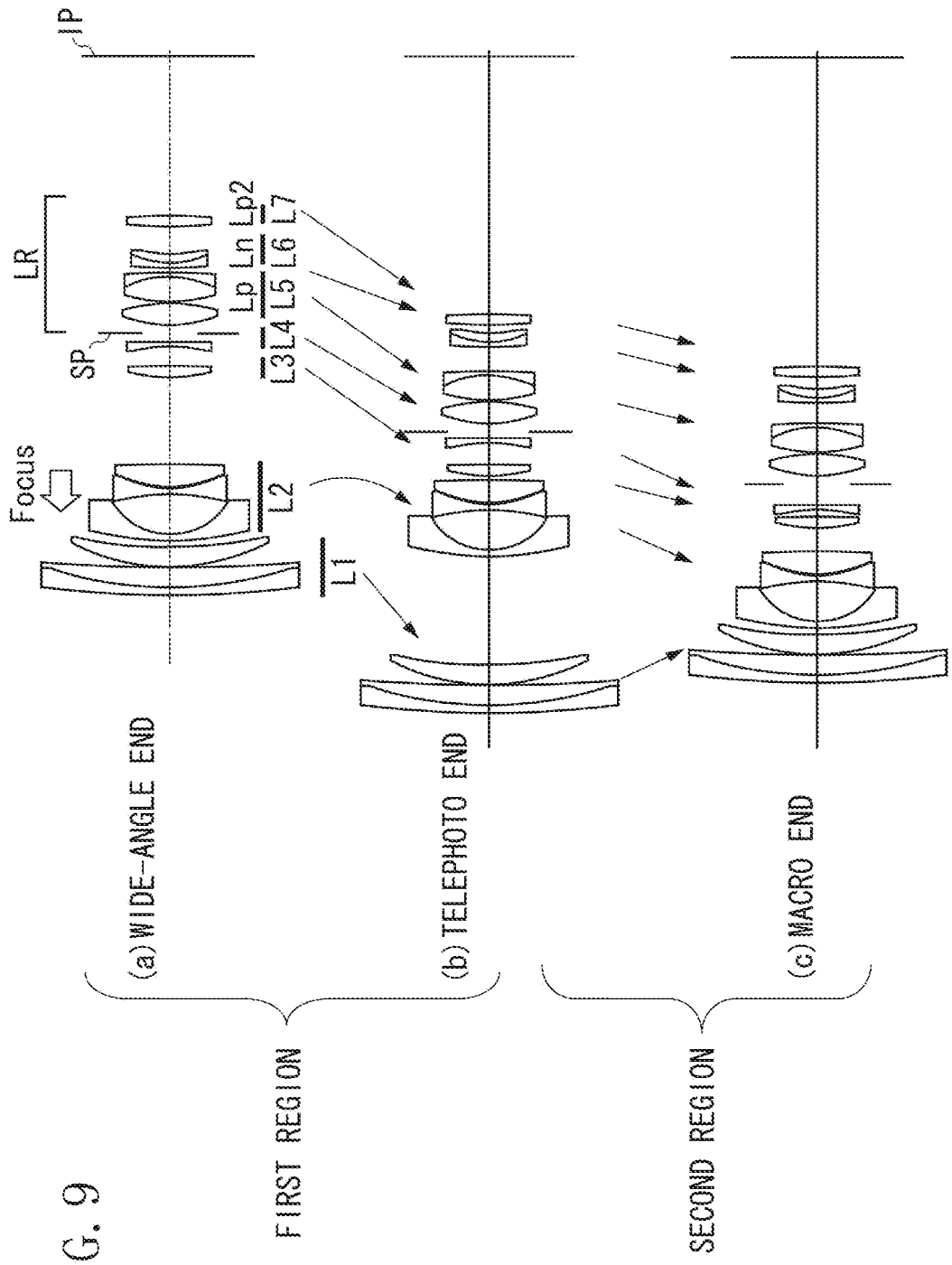

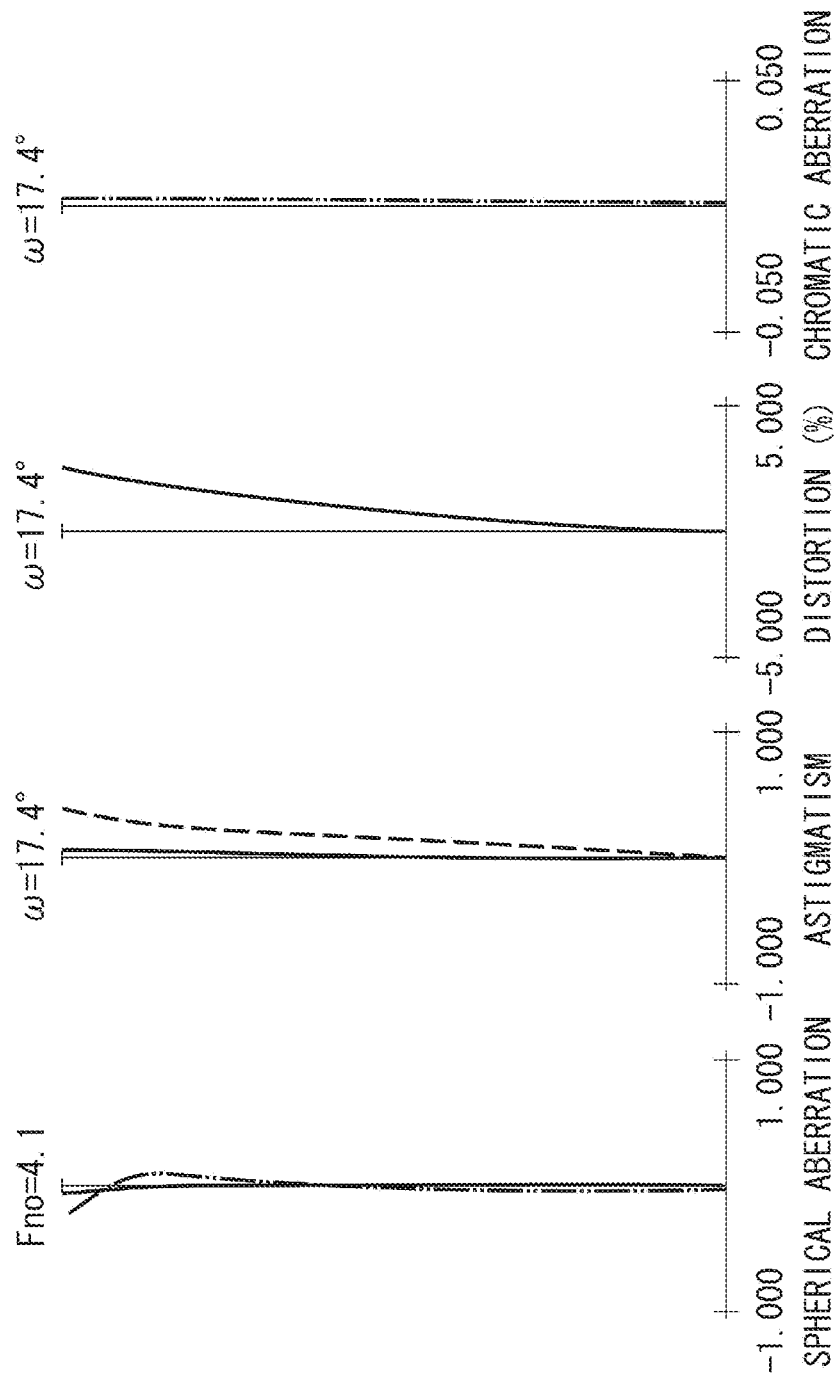

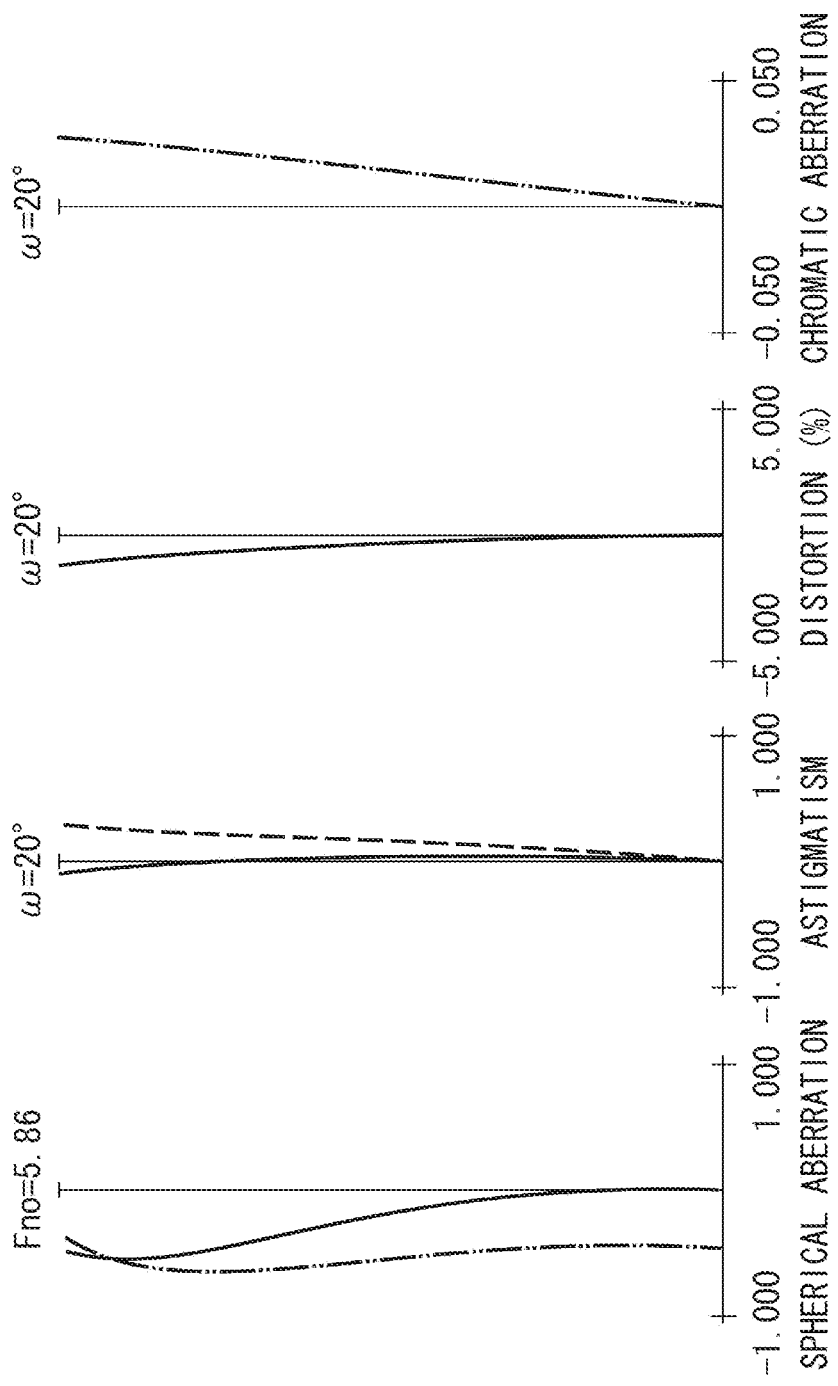

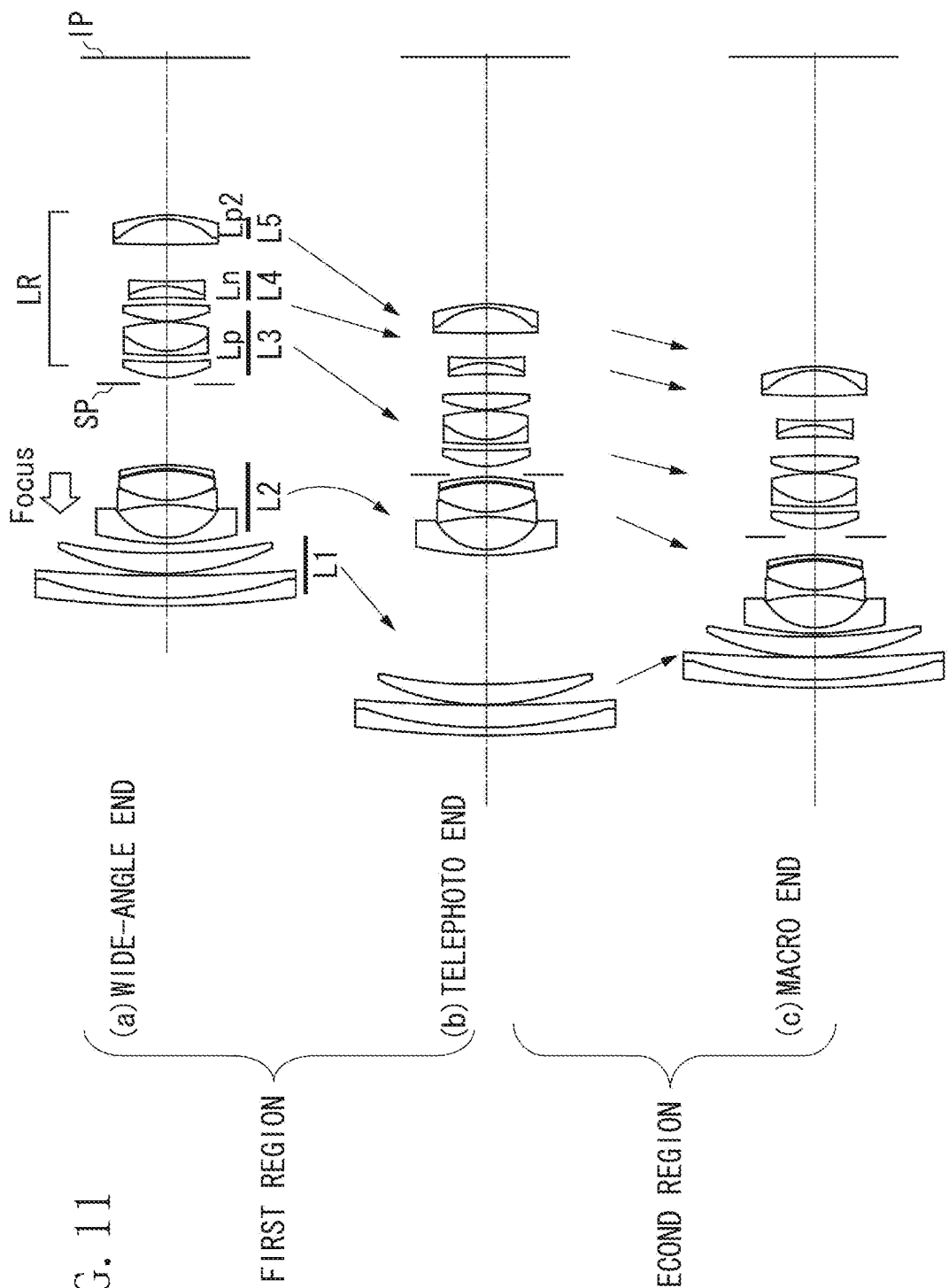

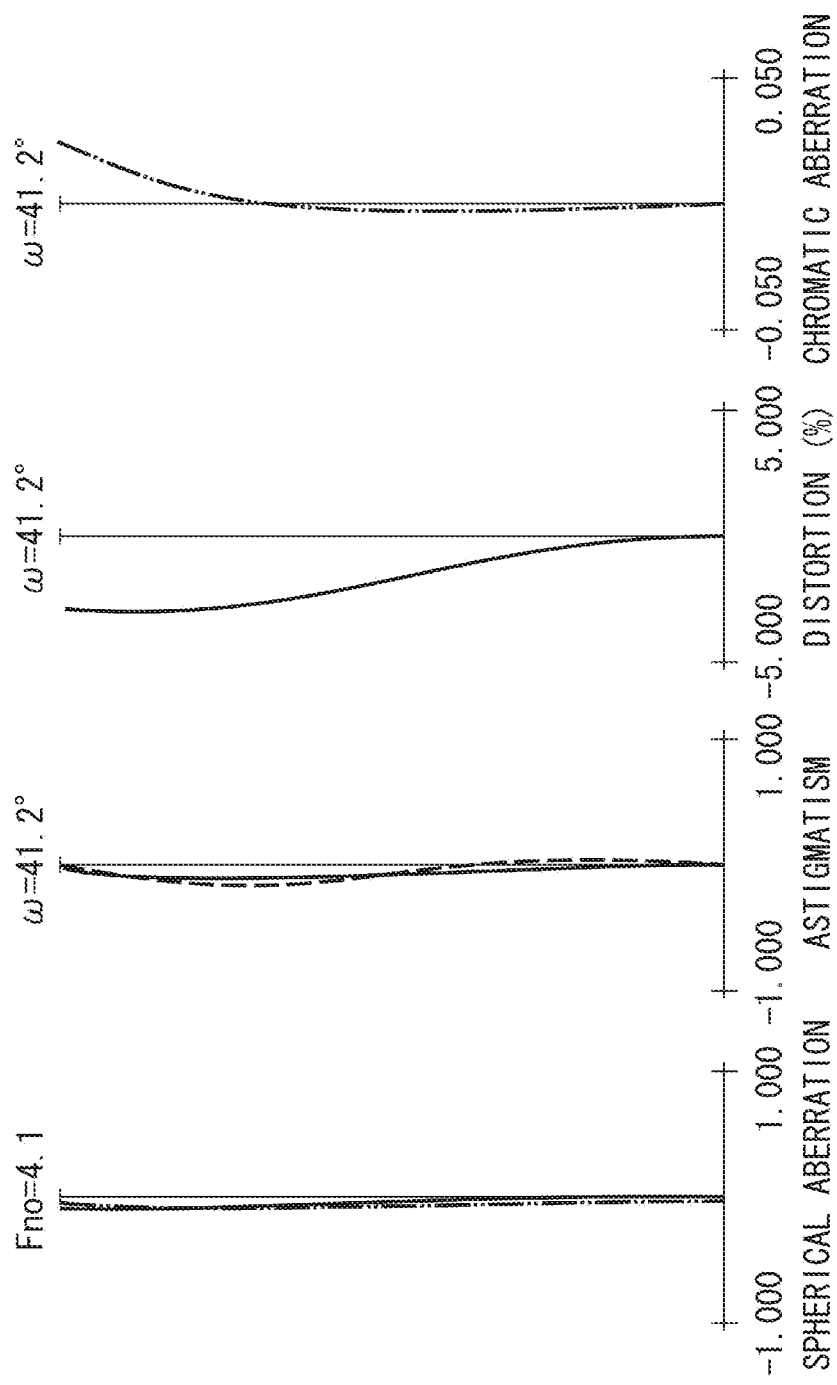

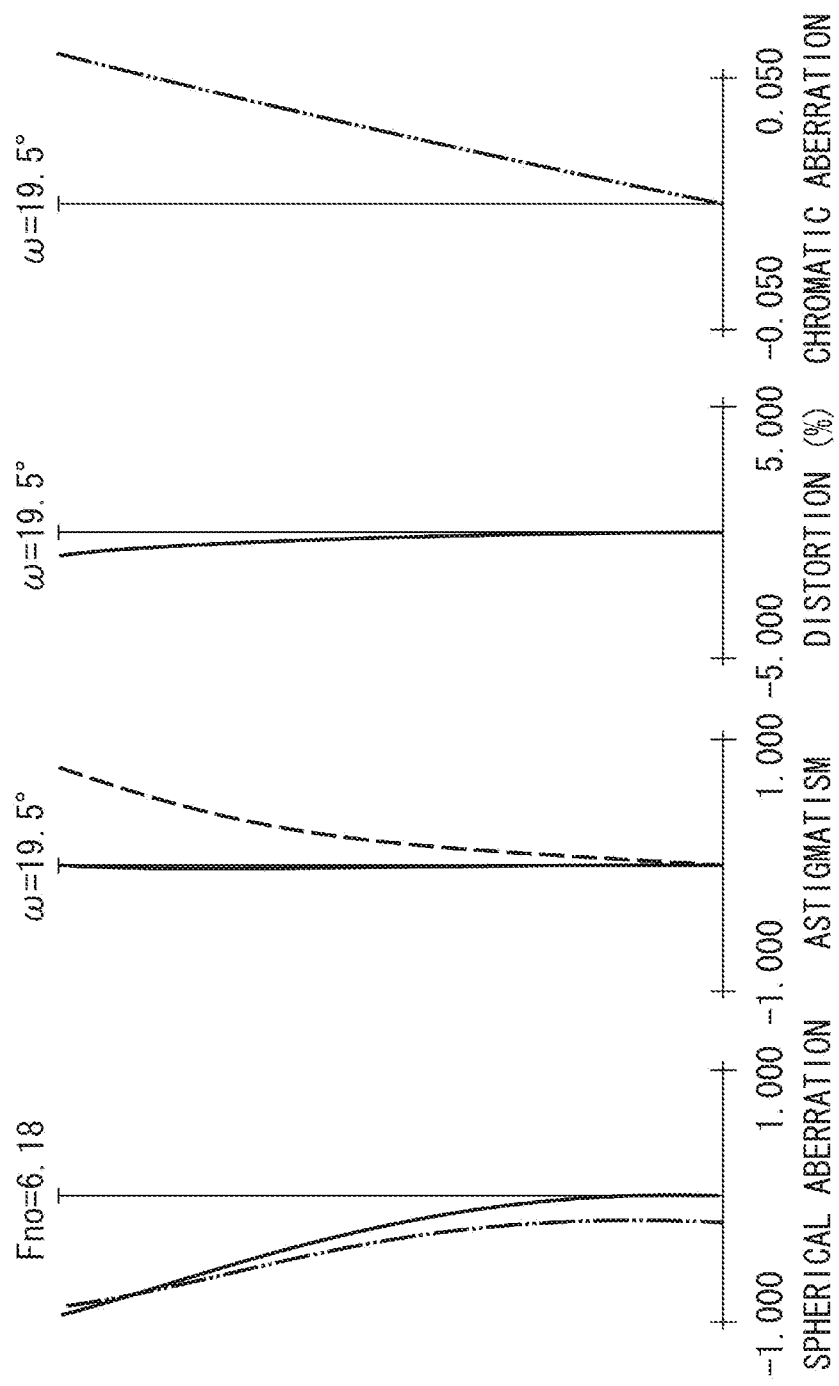

ZOOM LENS AND IMAGE PICKUP APPARATUS HAVING THE SAME

BACKGROUND OF THE INVENTION

1. Field of the Invention

The present invention relates to a zoom lens suitable to a digital camera, a video camera, or the like. More particularly, the present invention relates to a zoom lens including a macro mechanism that can obtain an excellent optical performance across an overall object distance.

2. Description of the Related Art

It is demanded for many photographic optical systems for use in image pickup apparatuses that a zoom lens is a zoom lens of a high zoom ratio as well as a zoom lens that can shoot an image of an object at a shorter distance at a high imaging magnification. As a focusing method for a zoom lens, an inner focus method is known in which focusing is performed by moving at least a single lens unit in an optical axis direction. The lens unit is disposed on the image side of a first lens unit disposed closest to an object side.

A zoom lens discussed in U.S. Patent Application Publication No. 2011/0116174 is a four-unit zoom lens including a first lens unit having positive refractive power, a second lens unit having negative refractive power, a third lens unit having positive refractive power, and a fourth lens unit having positive refractive power, in which focusing is performed from an infinite distance to a short distance by moving the second lens unit toward the object side.

Moreover, to improve an aberration variation during focusing, a floating method is known in which a plurality of lens units is moved in the optical axis direction. See Japanese Patent Application Laid-Open No. 2000-047107.

Furthermore, a zoom lens including a macro mechanism is known. A zoom lens discussed in Japanese Patent Application Laid-Open No. 11-352402 can perform macro shooting by moving a first lens unit and a second lens unit in such a way that a distance between the first lens unit and the second lens unit is increased at a telephoto end.

In order that a zoom lens obtains a high optical performance in the entire zooming range and across an overall object distance (the entire focusing range), it is necessary to appropriately set the power and a lens configuration of each lens unit forming the zoom lens, and a zooming method and a focusing method constituting the zoom lens. Generally, when it is desired to shorten a photographable object distance and to increase an imaging magnification, it is likely to increase an aberration variation during focusing and to decrease optical performance. Moreover, such a problem arises in that the amount of movement of a focus lens unit is increased to upsize the zoom lens.

The zoom lens discussed in U.S. Patent Application Publication No. 2011/0116174 can achieve focusing at a some short distance in the entire zooming range, and about a 0.2× imaging magnification can be achieved at a shortest distance at a telephoto end.

It is necessary in the zoom lens discussed in U.S. Patent Application Publication No. 2011/0116174 that a space is secured in the optical axis direction by an amount of the movement of the second lens unit for focusing. Thus, it is difficult to obtain a high imaging magnification exceeding a 0.5× magnification while downsizing the entire zoom lens. Furthermore, since only the second lens unit is moved during focusing, an aberration variation is increased and an aberration variation is likely to be increased particularly at the telephoto end.

Japanese Patent Application Laid-Open No. 2000-047107 discusses that a six-unit zoom lens includes a first lens unit having positive refractive power, a second lens unit having negative refractive power, a third lens unit having positive refractive power, a fourth lens unit having negative refractive power, a fifth lens unit having positive refractive power, and a sixth lens unit having negative refractive power. The fourth lens unit is moved toward the object side and the sixth lens unit is moved toward the image side so that focusing is performed from the infinite distance to a short distance. This technique can achieve focusing at some short distance in the entire zooming range, and can obtain an about 0.2× imaging magnification at a shortest distance at the telephoto end. During focusing, an aberration variation is decreased by moving the fourth lens unit in such a way that the fourth lens unit compensates aberration caused by the movement of the sixth lens unit. However, it is necessary to secure spaces in the optical axis direction by the amounts of the movement of the fourth lens unit and the sixth lens unit during focusing. Thus, it is difficult to obtain a high imaging magnification exceeding a 0.5× magnification while downsizing the entire zoom lens.

Japanese Patent Application Laid-Open No. 11-352402 discusses the zoom lens including a macro mechanism that can obtain a high imaging magnification of an about 0.5× magnification. However, a drive method for the lens units for macro shooting, for example, is not matched with the downsizing of the entire zoom lens and the providing of a high performance.

SUMMARY OF THE INVENTION

The present invention is directed to a zoom lens that has a small size in its entirety, that can obtain a high optical performance across an overall object distance, and that includes a macro drive mechanism which can provide a high imaging magnification, and is also directed to an image pickup apparatus including the zoom lens.

According to an aspect of the present invention, a zoom lens includes, in order from an object side to an image side, a lens unit Lp having the highest positive refractive power, a lens unit Ln having negative refractive power, and a lens unit Lp2 having positive refractive power, wherein a distance between every adjacent lens units varies during zooming. In a first region in which focusing from an infinite distance to a predetermined finite distance and zooming are able to be performed, two or more lens units are moved during zooming and one lens unit is moved during focusing. In a second region in which macro driving is performed from a telephoto end to a macro end at which focusing is able to be performed on an object distance shorter than the predetermined finite distance, two or more lens units are moved during macro driving so that the lens unit Lp is located closer to the object side than at a wide-angle end, a distance between the lens unit Lp and the lens unit Ln is larger at the macro end than at the wide-angle end, and a distance between the lens unit Ln and the lens unit Lp2 is smaller at the macro end than at the wide-angle end.

Further features of the present invention will become apparent from the following detailed description of exemplary embodiments with reference to the attached drawings.

BRIEF DESCRIPTION OF THE DRAWINGS

FIGS. 2A, 2B, and 2C are aberration diagrams at a wide-angle end, a telephoto end, and a macro end, respectively, during focusing on an infinite distance in the zoom lens according to the first exemplary embodiment of the present invention.

FIG. 3 is a lens cross-sectional view of a zoom lens according to a second exemplary embodiment of the present invention.

FIGS. 4A, 4B, and 4C are aberration diagrams at a wide-angle end, a telephoto end, and a macro end, respectively, during focusing on an infinite distance in the zoom lens according to the second exemplary embodiment of the present invention.

FIG. 5 is a lens cross-sectional view of a zoom lens according to a third exemplary embodiment of the present invention.

FIGS. 6A, 6B, and 6C are aberration diagrams at a wide-angle end, a telephoto end, and a macro end, respectively, during focusing on an infinite distance in the zoom lens according to the third exemplary embodiment of the present invention.

FIG. 7 is a lens cross-sectional view of a zoom lens according to a fourth exemplary embodiment of the present invention.

FIGS. 8A, 8B, and 8C are aberration diagrams at a wide-angle end, a telephoto, and a macro end, respectively, during focusing on an infinite distance in the zoom lens according to the fourth exemplary embodiment of the present invention.

FIG. 9 is a lens cross-sectional view of a zoom lens according to a fifth exemplary embodiment of the present invention.

FIGS. 10A, 10B, and 10C are aberration diagrams at a wide-angle end, a telephoto end, and a macro end, respectively, during focusing on an infinite distance in the zoom lens according to the fifth exemplary embodiment of the present invention.

FIG. 11 is a lens cross-sectional view of a zoom lens according to a sixth exemplary embodiment of the present invention.

FIGS. 12A, 12B, and 12C are aberration diagrams at a wide-angle end, a telephoto end, and a macro end, respectively, during focusing on an infinite distance in the zoom lens according to the sixth exemplary embodiment of the present invention.

DESCRIPTION OF THE EMBODIMENTS

In the following, a zoom lens and an image pickup apparatus including the zoom lens according to an exemplary embodiment of the present invention will be described with reference to the drawings. The zoom lens according to each exemplary embodiment of the present invention includes, in order from an object side to an image side, a lens unit Lp having the highest positive refractive power, a lens unit Ln having negative refractive power, and a lens unit Lp2 having positive refractive power. In a first region in which focusing and zooming are able to be performed from an infinite distance to a predetermined finite distance (a first object distance), a zoom drive mechanism is operated in such a way that two or more lens units are moved during zooming, and a focus drive mechanism is operated in such a way that one lens unit is moved during focusing. Moreover, in a second region in which macro driving is performed from a telephoto end to a macro end at which focusing is able to be performed on a distance shorter than a predetermined finite distance (a first object distance), the macro drive mechanism is operated in such a way that two or more lens units are moved during macro driving.

In the second region, the lens unit Lp is positioned closer to the object side than at the wide-angle end. Moreover, during macro driving from the telephoto end to the macro end, each lens unit is moved in such a way that a distance between the lens unit Lp and the lens unit Ln is larger at the macro end than at the wide-angle end and a distance between the lens unit Ln and the lens unit Lp2 is smaller at the macro end than at the wide-angle end.

The macro drive mechanism moves two or more lens units for macro driving from a state in which focusing is performed on a predetermined finite distance (the first object distance) at the telephoto end, so that focusing is continuously performed to a state in which focusing is performed on the shortest distance at the macro end in the second region. Furthermore, the zoom lens according to the present invention can stop the operation of the macro drive mechanism in the second region, and can operate the focus drive mechanism to adjust focus. For example, focus can be adjusted by rotating a focus ring or by operating a focus lens unit in autofocus operation.

Figure 1:
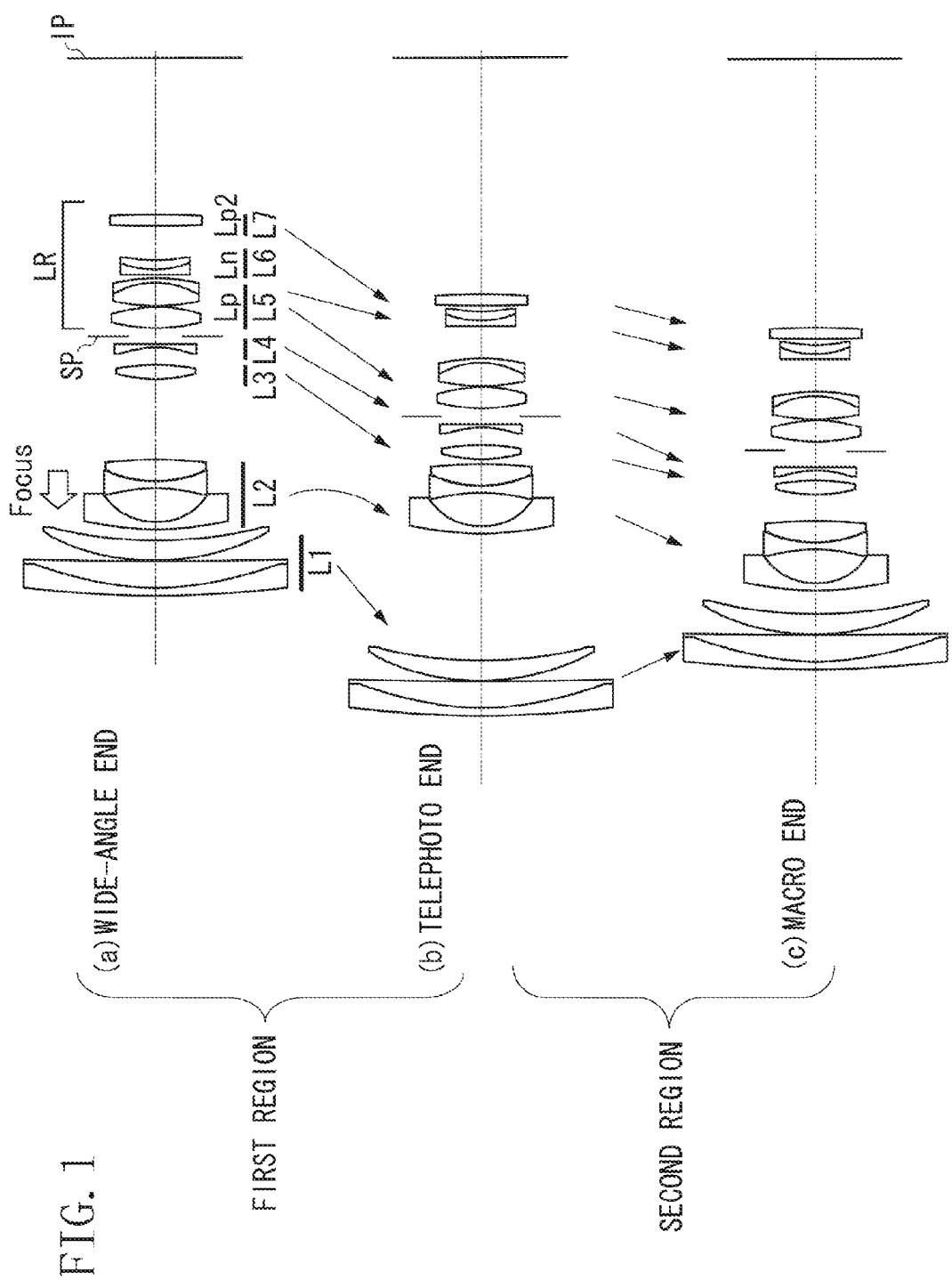
FIG. 1 is a lens cross-sectional view of a zoom lens according to a first exemplary embodiment of the present invention.
Figure 2A:
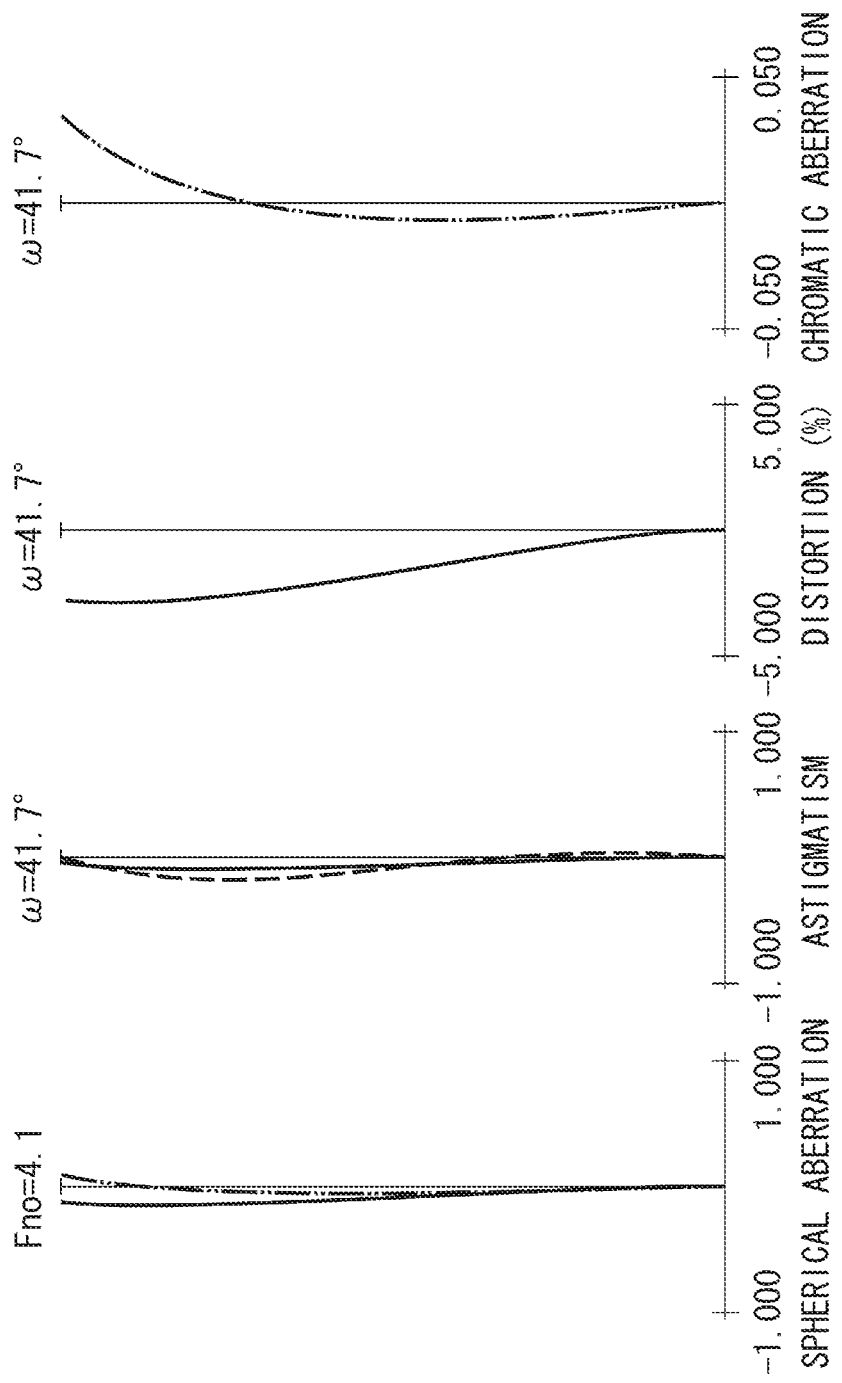
Figure 6B:
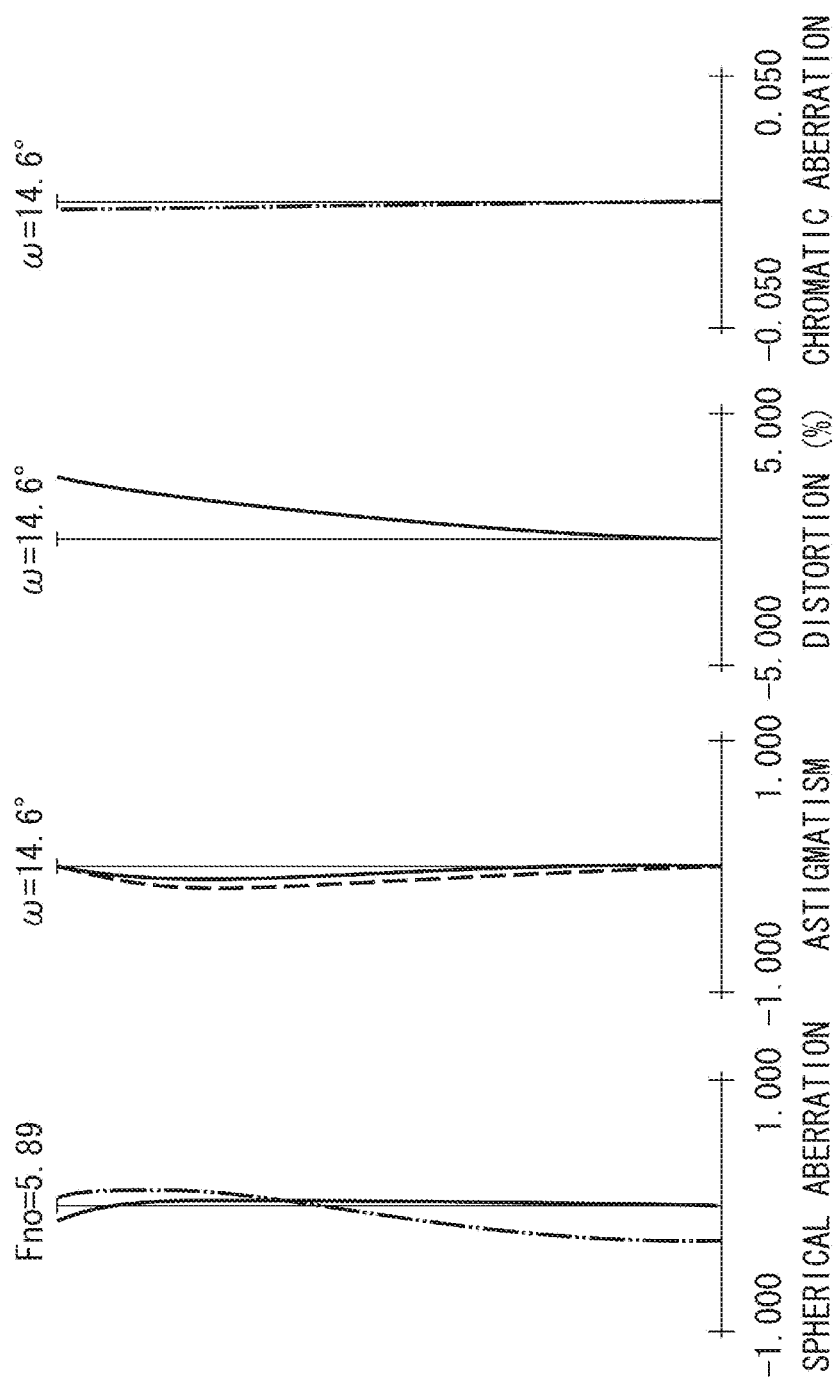

FIG. 1 is a lens cross-sectional view of a zoom lens according to a first exemplary embodiment of the present invention. FIGS. 2A, 2B, and 2C are aberration diagrams at a wide-angle end, a telephoto end, and a macro end, respectively, during focusing on an infinite distance in the zoom lens according to the first exemplary embodiment of the present invention. FIG. 3 is a lens cross-sectional view of a zoom lens according to a second exemplary embodiment of the present invention. FIGS. 4A, 4B, and 4C are aberration diagrams at a wide-angle end, a telephoto end, and a macro end, respectively, during focusing on an infinite distance in the zoom lens according to the second exemplary embodiment of the present invention. FIG. 5 is a lens cross-sectional view of a zoom lens according to a third exemplary embodiment of the present invention. FIGS. 6A, 6B, and 6C are aberration diagrams at a wide-angle end, a telephoto end, and a macro end, respectively, during focusing on an infinite distance in the zoom lens according to the third exemplary embodiment of the present invention.

Figure 8C:
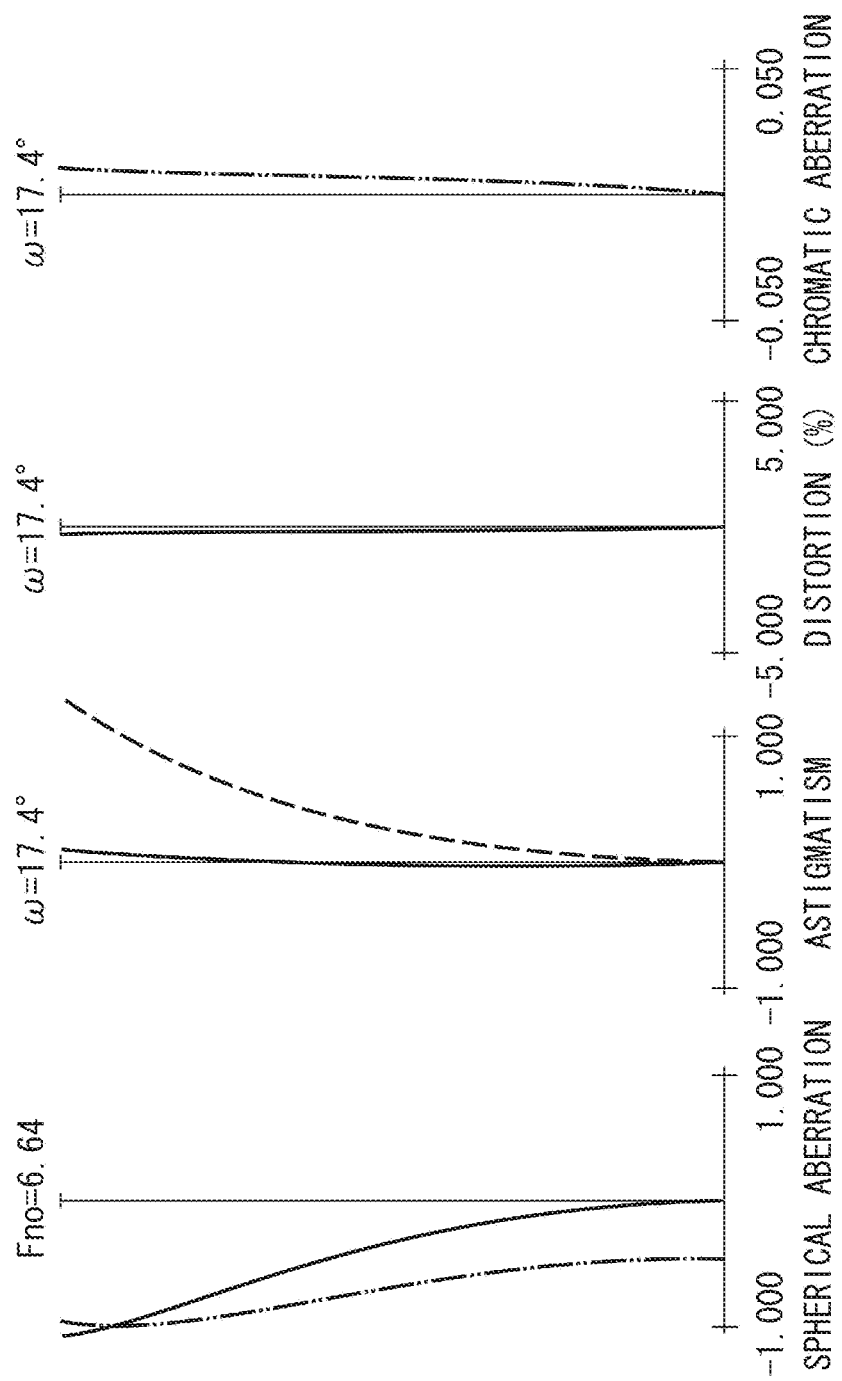
Figure 10A:
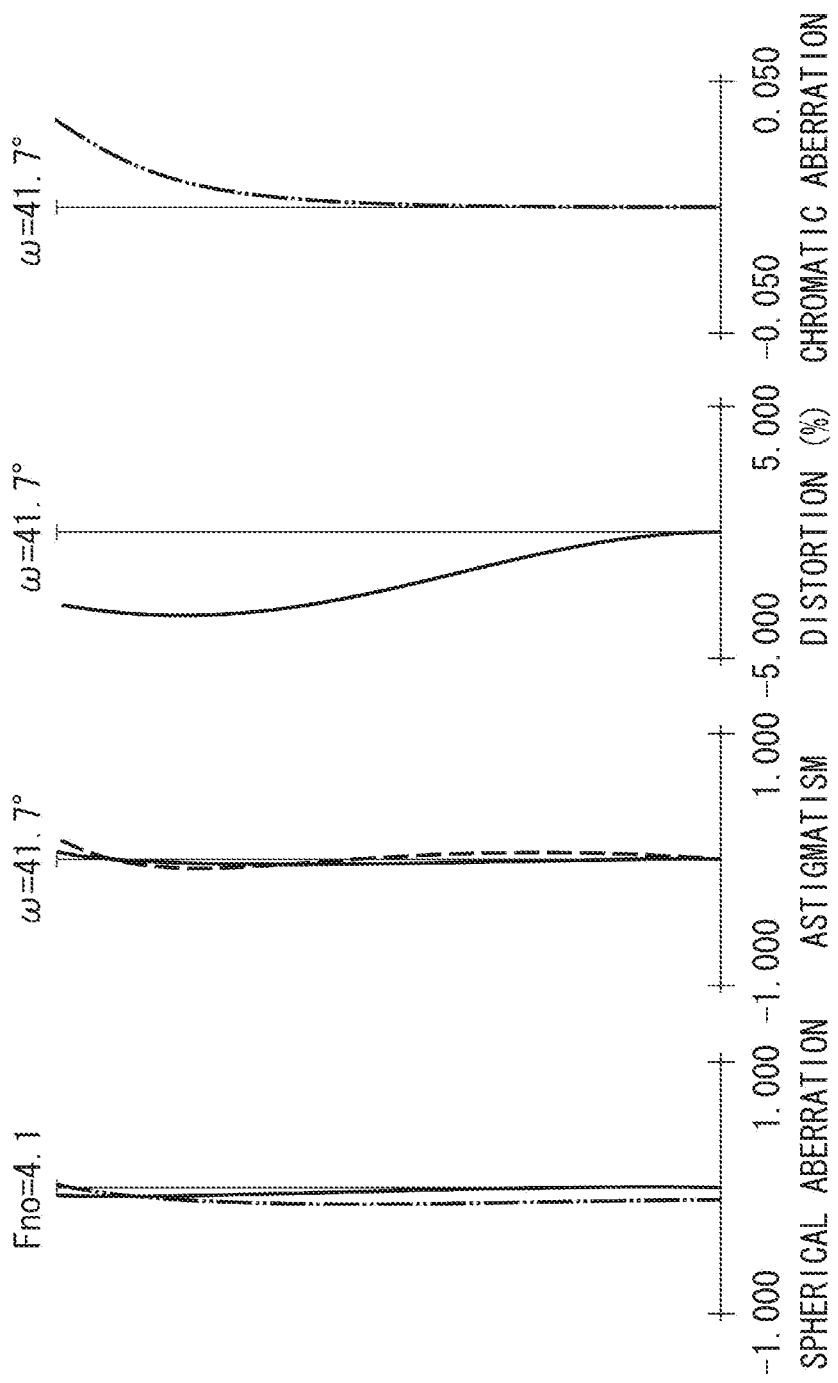
Figure 12B:
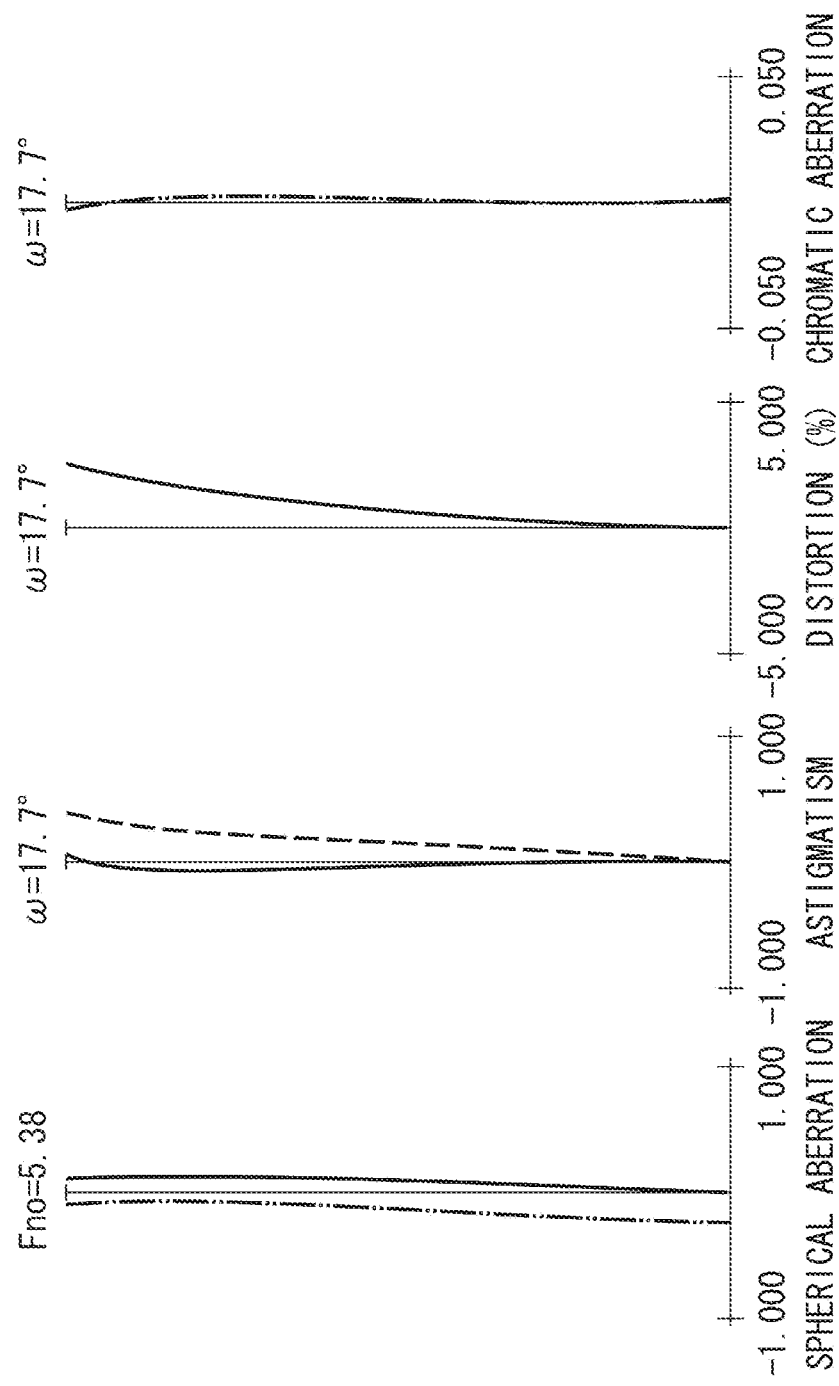
Figure 13:
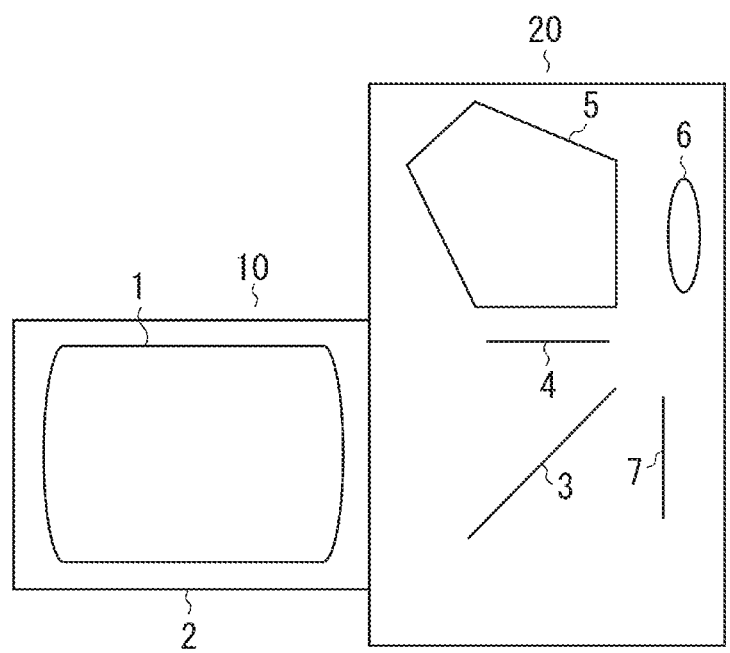
FIG. 13 is a schematic diagram of main components of an image pickup apparatus according to an exemplary embodiment of the present invention.

FIG. 7 is a lens cross-sectional view of a zoom lens according to a fourth exemplary embodiment of the present invention. FIGS. 8A, 8B, and 8C are aberration diagrams at a wide-angle end, a telephoto, and a macro end, respectively, during focusing on an infinite distance in the zoom lens according to the fourth exemplary embodiment of the present invention. FIG. 9 is a lens cross-sectional view of a zoom lens according to a fifth exemplary embodiment of the present invention. FIGS. 10A, 10B, and 10C are aberration diagrams at a wide-angle end, a telephoto end, and a macro end, respectively, during focusing on an infinite distance in the zoom lens according to the fifth exemplary embodiment of the present invention. FIG. 11 is a lens cross-sectional view of a zoom lens according to a sixth exemplary embodiment of the present invention. FIGS. 12A, 12B, and 12C are aberration diagrams at a wide-angle end, a telephoto end, and a macro end, respectively, during focusing on an infinite distance in the zoom lens according to the sixth exemplary embodiment of the present invention. FIG. 13 is a schematic diagram of main components of an image pickup apparatus according to an exemplary embodiment of the present invention.

Each lens cross-sectional view illustrates an i-th lens unit Li when i is counted from the object side, and a partial system LR (a composite lens unit) including one or more lens units. The partial system LR includes, in order from the object side to the image side, a lens unit Lp having the highest positive refractive power, a lens unit Ln having negative refractive power, and a lens unit Lp2 having positive refractive power. In some cases, another lens unit is disposed between the lens units. SP is an aperture stop.

An image plane IP corresponds to the imaging surface of a solid-state image sensor (a photoelectric conversion element) such as a charge-coupled device (CCD) sensor and a complementary metal-oxide semiconductor (CMOS) sensor when the zoom lens is used for a photographic optical system of a video camera and a digital still camera, and the image plane P corresponds to a film surface when the zoom lens is used for a silver-halide film camera. In the lens cross-sectional views, the first region indicates a zooming region, and the second region indicates a macro region.

In the first region, arrows indicate the moving loci of the lens units during zooming from the wide-angle end to the telephoto end. In the second region, arrows indicate the moving directions of the lens units during macro driving (macro focusing) from the telephoto end to the macro end in the second region. An arrow for focus indicates the moving direction of the lens unit when focusing is performed from the infinite distance to a short distance.

In the spherical aberration diagrams, a solid line indicates the d-line, and a two-dot chain line indicates the g-line. In the astigmatic aberration diagrams, a solid line indicates a meridional image plane, and a broken line indicates a sagittal image plane at the d-line. Chromatic aberration of magnification is expressed by the g-line. Fno is an F-number, and ω is a half angle of view.

The zoom lens of the first exemplary embodiment in FIG. 1 is a seven-unit zoom lens including, in order from the object side to the image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having positive refractive power. During zooming from the wide-angle end to the telephoto end, the first lens unit L1 and the third lens unit L3 to the seventh lens unit L7 are all moved toward the object side, and the second lens unit L2 is moved with a locus convex toward the image side, as indicated by the arrows. Focusing is performed by moving the second lens unit L2.

The zoom lens according to the second exemplary embodiment in FIG. 3 is a six-unit zoom lens including, in order from the object side to the image side, a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having positive refractive power. During zooming from the wide-angle end to the telephoto end, the first lens unit L1 and the third lens unit L3 to the sixth lens unit L6 are all moved toward the object side, and the second lens unit L2 is moved with a locus convex toward the image side, as indicated by the arrows. Focusing is performed by moving the second lens unit L2.

The lens configuration of the third exemplary embodiment in FIG. 5 is the same as the lens configuration of the first exemplary embodiment in FIG. 1. The zoom lens according to the fourth exemplary embodiment in FIG. 7 is a six-unit zoom lens including, in order from the object side to the image side, a first lens unit L1 having negative refractive power, a second lens unit L2 having positive refractive power, a third lens unit L3 having negative refractive power, a fourth lens unit L4 having positive refractive power, a fifth lens unit L5 having negative refractive power, and a sixth lens unit L6 having positive refractive power. During zooming from the wide-angle end to the telephoto end, the first lens unit L1 is moved with a locus convex toward the image side, and the second lens unit L2 to the sixth lens unit L6 are all moved toward the object side.

Focusing is performed by moving the first lens unit L1.

The lens configuration and the zooming method of the fifth exemplary embodiment in FIG. 9 are the same as that of the first exemplary embodiment in FIG. 1.

The zoom lens according to the sixth exemplary embodiment in FIG. 11 is a five-unit zoom lens including, in order from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. During zooming from the wide-angle end to the telephoto end, the first lens unit L1 and the third lens unit L3 to the fifth lens unit L5 are all moved toward the object side, and the second lens unit L2 is moved with a locus convex toward the image side. Focusing is performed by moving the second lens unit L2.

As in the zoom lenses discussed in U.S. Patent Application Publication No. 2011/0116174 and Japanese Patent Application Laid-Open No. 2000-047107, a type of zoom lens in which one or two lens units are moved during focusing, focusing is easily performed from the infinite distance to a predetermined finite distance in the entire range from the wide-angle end to the telephoto end. As for an aberration variation caused by focusing, when a single focus lens unit is provided, it is difficult to correct an aberration variation, and optical performance is degraded particularly at the telephoto end. As compared with such a zoom lens, in the floating method in which two lens units are moved, it is easy to correct an aberration variation.

However, in a method in which a focus lens unit for focusing is not moved during zooming, it is necessary to secure a space in the optical axis direction by an amount of the focus lens unit moved during focusing in addition to a space during zooming. Thus, the entire zoom lens is more increased in size as a higher imaging magnification is demanded. For example, when it is desired to implement a higher imaging magnification in the zoom lens discussed in U.S. Patent Application Publication No. 2011/0116174, it is necessary to provide a space in advance between the first lens unit and the second lens unit for an amount that the second lens unit having negative refractive power is greatly moved toward the object side during focusing. Therefore, power disposition at the wide-angle end is likely to be out of a retrofocus type.

The zoom lens discussed in Japanese Patent Application Laid-Open No. 11-352402 separately performs zooming and focusing in a normal mode (this corresponds to the first region according to the exemplary embodiment). Focusing is performed from the infinite distance to a predetermined finite distance by moving the third lens unit toward the image side in the entire range from the wide-angle end to the telephoto end. The first lens unit and the second lens unit are again disposed for macro shooting at the telephoto end, so that a high imaging magnification is implemented (this corresponds to the second region according to the exemplary embodiment). However, in the zoom lens discussed in Japanese Patent Application Laid-Open No. 11-352402, since the third lens unit and the lens units subsequent to the third lens unit are not moved during macro driving, it is not possible to always efficiently obtain a high imaging magnification. Generally, to increase imaging magnifications in an imaging optical system having positive refractive power (optical power), it is necessary to increase a distance between a rear principal point position of the optical system and an image point.

In the zoom lens according to the exemplary embodiment of the present invention, the lens unit Lp having the highest positive refractive power among the optical units is moved in the second region, so that the imaging magnification is efficiently increased with a smaller amount of movement.

The zoom lens according to the exemplary embodiment of the present invention includes a plurality of lens units including the lens unit Lp having the highest positive refractive power, the lens unit Ln having negative refractive power, and the lens unit Lp2 having positive refractive power disposed in order from the object side to the image side, and two or more lens units are moved in the first region for zooming.

Moreover, in the second region, macro focusing is performed by moving at least the positive lens unit Lp toward the object side. Furthermore, macro driving is performed in such a way that a distance between the lens unit Lp and the lens unit Ln is larger and a distance between the lens unit Ln and the lens unit Lp2 is smaller at the macro end in the second region than at the wide-angle end in the first region.

During macro driving from the telephoto end to the macro end, two or more lens units including the positive lens unit Lp are moved toward the object side. Furthermore, focusing is easily performed on a short distance by moving the focus lens unit in such a way that focusing is performed on a short distance.

Generally, when the focus lens unit is further moved toward the short distance side from a state in which focusing is performed on a short distance at the telephoto end, a high imaging magnification is obtained according to paraxial calculation. However, considerable spherical aberration actually occurs on the over side.

Therefore, during macro driving in the second region, the positive lens unit Lp is moved toward the object side, and the principal point position of the entire zoom lens is moved toward the object side while producing spherical aberration on the under side, so that focusing can be performed on an object at a distance shorter than a predetermined finite distance. Moreover, each lens unit is moved in such a way that a distance between the lens unit Lp and the lens unit Ln is larger and a distance between the lens unit Ln and the lens unit Lp2 is smaller at the macro end than at the wide-angle end, so that the principal point position of the entire zoom lens can be moved from the image side to the object side.

Thus, a wider angle of view and a high zoom ratio can be implemented in the first region without increasing the amount of movement of the lens unit Lp, and a high imaging magnification can be implemented in the second region.

The zoom lens according to the present invention will be described from another aspect. Generally, in the zoom lens, the entire zoom lens is downsized by reducing a distance between the lens units at the wide-angle end or at the telephoto end. In the downsizing, the focus lens unit is often in a state in which a distance between the focus lens unit and the lens unit on the front side of the focus lens unit and a distance between the focus lens unit and the lens unit on the rear side of the focus lens unit are short in a state in which focusing is performed on the infinite distance at the telephoto end and in a state in which focusing is performed on a short distance at the wide-angle end.

Thus, when a premise is assumed that focusing is performed from an infinite-distance object to a near-distance object in the entire zooming range, when it is desired to further increase the range of performing focusing to the short distance side, the amounts of movement of the lens units on the front side and on the rear side are inevitably increased to upsize the entire zoom lens.

Therefore, in other words, in the present invention, the drive region on the infinite distance side at the telephoto end is restricted in the second region. For example, part (c) in FIG. 1 is a cross sectional view of a state in which the second lens unit L2 is in focus on a shortest distance at the macro end by focusing. At this time, when the second lens unit L2 is moved toward the infinite distance side, the second lens unit L2 interferes with the third lens unit L3 before focusing is performed on an infinite distance.

This also relates to a fact that a distance d12 takes a negative value in a second region in a numerical example 1, for example, (numerical examples illustrate the positions of lens units when focusing is performed on an infinite distance for convenience). In other words, the fact that the movement of the second lens unit L2 for focusing is restricted on the infinite distance side, and the space for the movement is allocated to the lens unit (the third lens unit L3), which is adjacent to the second lens unit L2 for focusing, to move toward the object side, so that spherical aberration is changed to the under side while moving an in-focus position (a focus position) to a shorter distance.

Thus, the second lens unit L2 for focusing can also be further driven toward a shorter distance side at a normal short distance in-focus position at the telephoto end, and focusing is easily performed on a short distance without considerable degradation of spherical aberration.

Next, more desirable conditions will be described for implementing the present invention. Each exemplary embodiment may satisfy one or more of the conditions below. Suppose that the focal length of the lens unit Lp is $F_{LP}$, and the focal length of the lens unit Lp2 is $F_{Lp2}$. Suppose that the focal length of the lens unit Ln is $F_{Ln}$. Suppose that a distance on the optical axis from the lens surface of the lens unit Lp on the object side to the front principal point position of the partial system LR including the lens unit Lp to the lens unit Lp2 at the macro end in the second region is o1LP (where the distance is a positive distance when measured from the object side to the image side). Suppose that a distance on the optical axis from the lens surface of the lens unit Lp on the object side to the lens surface of the lens unit Lp2 on the image side at the macro end in the second region is BldLP. Suppose that the amount of movement of the lens unit Lp from the telephoto end to the macro end is mLp (where the amount is a positive amount when measured from the object side to the image side). Suppose that the total lens length at the wide-angle end is TLDw, and the imaging magnification is βm when focusing is performed on a shortest distance at the macro end. At this time, one or more conditions below may be satisfied.

$$0.05 < F_{LP}/F_{LP2} < 0.60 \quad (1)$$

$$0.20 < -F_{LP}/|F_{Ln}| < 0.90 \quad (2)$$

$$-0.30 < o1LP/BldLP < 0.40 \quad (3)$$

$$0.01 < mLp/TLDw/\beta m < 0.40 \quad (4)$$

In each exemplary embodiment, the positive principal point position of the partial system LR including the lens unit Lp and the lens units on the rear side of the lens unit Lp is provided closer to the object side by reducing the refracting power of the lens unit Lp2 to some extent with respect to the refracting power of the lens unit Lp having the highest positive refractive power in the entire zoom lens. Thus, a high imaging magnification is efficiently achieved without increasing the amounts of movement of the lens unit Lp and the lens units on the rear side of the lens unit Lp too much. More specifically, the condition (1) is satisfied.

When the upper limit of the condition (1) is exceeded, it is difficult to perform efficient macro driving because the principal point position of the partial system LR is close to the image side. When the lower limit of the condition (1) is exceeded, it is difficult to take a desirable power disposition at a wider angle of view because the principal point position of the partial system LR is moved too much toward the object side. The condition (1) can satisfy a condition (1a).

$$0.10 < F_{LP}/F_{LP2} < 0.40 \quad (1a)$$

The condition (2) is a condition to more effectively achieve a high imaging magnification in the partial system LR. When the upper limit of the condition (2) is exceeded, it is difficult to correct aberration because the power of the lens unit Ln is too strong. Moreover, when the lower limit is exceeded, it is difficult to efficiently move the principal point position of the entire zoom lens toward the object side because the power of the lens unit Ln is too weak. The condition (2) can satisfy a condition (2a).

$$0.30 < -F_{LP}/|F_{Ln}| < 0.80 \quad (2a)$$

The condition (3) is a condition to more effectively achieve a high imaging magnification in the partial system LR. The condition (3) is satisfied, so that the principal point position of the partial system LR is disposed on the image side to some extent, and a high imaging magnification can be achieved without increasing the amount of movement of the partial system LR too much. When the upper limit of the condition (3) is exceeded, the amount of movement of the partial system LR including the lens unit Lp and the lens units on the rear side of the lens unit Lp is increased to achieve a high imaging magnification because the principal point position of the partial system LR comes close to the image plane.

When the lower limit of the condition (3) is exceeded, the principal point position of the partial system LR is located on the object side. Although an imaging magnification can be increased when focusing is performed on a shortest distance in the second region, it is difficult to provide the principal point position on the image side at the wide-angle end in the first region, and a desirable power disposition is not taken at the wide-angle end. The condition (3) can satisfy a condition (3a).

$$-0.20 < o1LP/BldLP < 0.25 \quad (3a)$$

The condition (4) relates to the amount of movement of the lens unit Lp and the total lens length to form the entire zoom lens in a simple configuration as much as possible. When the upper limit of the condition (4) is exceeded, the amount of moving the lens unit Lp during macro driving is increased with respect to the shortest total lens length, and the drive mechanism becomes complicated. When the lower limit of the condition (4) is exceeded, the amount of movement of the lens unit Lp is decreased too much as compared with the imaging magnification at the macro end, and the optical performance is degraded at the macro end. The condition (4) can satisfy a condition (4a).

$$0.015 < mLp/TLDw/\beta m < 0.300 \quad (4a)$$

Next, a desirable lens configuration of each exemplary embodiment will be described.

The zoom lens of each exemplary embodiment may include, in order from the object side to the image side, a first lens unit having positive refractive power and a second lens unit having negative refractive power, in which a distance between the first lens unit and the second lens unit is larger at a telephoto end in the first region than at the wide-angle end.

The first lens unit may be moved toward the image side during macro driving from the telephoto end to the macro end.

To provide a high variable power in the first region, the zoom lens can be a positive-lead type zoom lens including, in order from the object side to the image side, the first lens unit L1 having positive refractive power and the second lens unit L2 having negative refractive power. At this time, to move the rear principal point position toward the object side during macro driving from the telephoto end to the macro end, the first lens unit L1 can be moved toward the object side. However, this effect itself is not exerted well so much on the first lens unit L1, which is greatly away from the lens unit Lp toward the object side.

Because of this, such a configuration may be possible in which the first lens unit L1 is moved toward the image side on purpose, and a distance between the front principal point position of the entire zoom lens and the first lens unit is decreased to secure a working distance (a distance from an object to the first lens surface). From the viewpoint of the downsizing of the entire zoom lens, the amount of movement of the first lens unit L1 can be reduced with respect to the wide-angle end in the first region.

Next, when it is intended to provide a wider angle in the first region, a negative-lead type zoom lens is desirable in which the first lens unit having negative refractive power is disposed closest to the object side. In the first region, the focus lens unit may be a focus lens unit in which the lens unit having the highest negative refractive power is moved during focusing. When it is intended to provide a wider angle of view in the first region, desirably, the focus lens unit in the first region is a lens unit having the highest negative power in the entire zoom lens because the amount of movement is reduced in both of the positive-lead type zoom lens and the negative-lead type zoom lens.

Moreover, in each exemplary embodiment, the position of the focus lens unit in the optical axis direction when focusing is performed on the infinite distance at the telephoto end may be overlapped with the position of the lens unit adjacent to the image side in the optical axis direction in a part of the second region in the optical axis direction. Therefore, focusing can be performed on a shorter distance by effectively utilizing a space without upsizing the entire zoom lens.

The lens unit Lp and the lens unit Lp2 may be integrally moved with each other during zooming. Furthermore, the drive mechanism can be simplified when the lens unit Lp and the lens unit Lp2 are driven integrally.

Here, the lens unit of each exemplary embodiment includes surfaces from the frontmost surface of the optical unit or a surface from which a distance to the lens adjacent to the front side varies during zooming to the rearmost surface of the optical unit or a surface from which a distance to the lens adjacent to the rear side varies during zooming in the case of a zoom lens.

In the following, the lens configuration of each exemplary embodiment will be described. The first exemplary embodiment is a seven-unit zoom lens including, in order from the object side to the image side, the first lens unit L1 having positive refractive power, the second lens unit L2 having negative refractive power, the third lens unit L3 having positive refractive power, the fourth lens unit L4 having negative refractive power, and the fifth lens unit L5 having positive refractive power, and further including the sixth lens unit L6 having negative refractive power and the seventh lens unit L7 having positive refractive power.

The fifth lens unit L5 corresponds to the lens unit Lp having the highest positive refractive power. The sixth lens unit corresponds to the lens unit Ln, and the seventh lens unit L7 corresponds to the lens unit Lp2. The zoom ratio in the first region is 2.8, and the fifth lens unit L5 is moved toward the object side during zooming from the wide-angle end to the telephoto end.

Each lens unit is moved during zooming in such a way that a distance between the first lens unit L1 and the second lens unit L2 is larger, a distance between the second lens unit L2 and the third lens unit L3 is smaller, a distance between the fifth lens unit L5 and the sixth lens unit L6 is larger, and a distance between the sixth lens unit L6 and the seventh lens unit L7 is smaller at the telephoto end than at the wide-angle end.

During focusing from the infinite distance to a predetermined finite distance, the second lens unit L2 is moved toward the object side. Thus, the rear principal point position of the entire zoom lens is moved toward the object side to obtain a variable power effect. Here, in the first region, a distance between the third lens unit L3 and the fourth lens unit L4 and a distance between the fourth lens unit L4 and the fifth lens unit L5 may not be necessarily changed during zooming. Focusing can be performed on an object at a shorter distance (at a short distance) in the second region than in the first region. The maximum imaging magnification in the first region is a 0.17× magnification, whereas the imaging magnification is a 0.7× magnification at the macro end in the second region.

At the macro end in the second region, the fifth lens unit L5 is moved toward the object side with respect to the telephoto end in the first region. Moreover, such settings are made on each lens unit to be moved in such a way that a distance between the first lens unit L1 and the second lens unit L2 is smaller, a distance between the second lens unit L2 and the third lens unit L3 is larger, a distance between the third lens unit L3 and the fourth lens unit L4 is smaller, and a distance between the fourth lens unit L4 and the fifth lens unit L5 is larger. Therefore, the rear principal point position of the entire zoom lens is effectively moved toward the object side, and a high imaging magnification is obtained.

Here, in the second region, a distance between the fifth lens unit L5 and the sixth lens unit L6 and a distance between the sixth lens unit L6 and the seventh lens unit L7 may not be necessarily changed during macro driving. Furthermore, the fifth lens unit L5 and the seventh lens unit L7 satisfy the conditions (1) and (3). The principal point position of the partial system LR including the fifth lens unit L5 to the seventh lens unit L7 is effectively moved toward the object side in the second region, and a high imaging magnification is obtained.

Moreover, the fifth lens unit L5 and the sixth lens unit L6 satisfy the condition (2), and the rear principal point position of the entire zoom lens is moved toward the object side from the wide-angle end to the macro end. Furthermore, the amount of movement of the fifth lens unit L5 satisfies the condition (4) during macro driving from the telephoto end to the macro end, so that the downsizing of the entire zoom lens and the providing of a high magnification in the entire zoom lens can be combined.

Moreover, the first lens unit L1 is moved toward the image side during macro driving from the telephoto end to the macro end, so that a working distance can be effectively secured at the macro end.

Part (b) in FIG. 1 illustrates a state in which focusing is performed on a predetermined finite distance in the first region at the telephoto end. Focusing can be continuously performed using the macro drive mechanism from a state in which the second lens unit L2 is positioned on the object side in part (b) in FIG. 1 to a state in which focusing is performed on a shortest distance at the macro end in the second region (the state corresponds to part (c) in FIG. 1). Furthermore, the focusing operation using the macro drive mechanism from a state in which focusing is performed on a shortest distance at the macro end in the second region (part (c) in FIG. 1) to a state in which focusing is performed on an object at a predetermined finite distance at the telephoto end is inverse to the case described above.

In addition, such a configuration may be possible in which the operation of the macro drive mechanism is stopped, the focus drive mechanism is operated, and the second lens unit L2, which is the focus lens unit, is moved to adjust focus. Moreover, an auto focus mechanism (an AF mechanism) may be used for autofocus. Such operations are similarly applicable to the second, third, fifth, and sixth exemplary embodiments.

The second exemplary embodiment is a six-unit zoom lens including, in order from the object side to the image side, the first lens unit L1 having positive refractive power, the second lens unit L2 having negative refractive power, the third lens unit L3 having positive refractive power, the fourth lens unit L4 having positive refractive power, the fifth lens unit L5 having negative refractive power, and the sixth lens unit L6 having positive refractive power. The third lens unit L3 corresponds to the lens unit Lp having the highest positive refractive power. The fifth lens unit L5 and the sixth lens unit L6 correspond to the lens units Ln and Lp2.

The zoom ratio in the first region is 2.8, and the third lens unit L3 is moved toward the object side at the telephoto end more than at the wide-angle end. Each lens unit is moved during zooming in such a way that a distance between the first lens unit L1 and the second lens unit L2 is larger, a distance between the second lens unit L2 and the third lens unit L3 is smaller, a distance between the fourth lens unit L4 and the fifth lens unit L5 is larger, and a distance between the fifth lens unit L5 and the sixth lens unit L6 is smaller at the telephoto end than at the wide-angle end. The second lens unit L2 is moved toward the object side, so that focusing is performed from the infinite distance to a predetermined finite distance. Thus, the rear principal point position of the entire zoom lens is effectively moved toward the object side, and a variable power effect is obtained.

In the first region, a distance between the third lens unit L3 and the fourth lens unit L4 may not be necessarily changed. Focusing can be performed on an object at a much shorter distance in the second region than in the first region. The maximum imaging magnification in the first region is a 0.14× magnification, whereas the maximum imaging magnification is a 0.6× magnification at the macro end in the second region.

The third lens unit L3 is moved toward the object side at the macro end in the second region with respect to the telephoto end in the first region. Moreover, a distance between the first lens unit L1 and the second lens unit L2 is smaller, a distance between the second lens unit L2 and the third lens unit L3 is larger, and a distance between the third lens unit L3 and the fourth lens unit L4 is smaller at the macro end in the second region than at the telephoto end in the first region.

In the second region, a distance between the fourth lens unit L4 and the fifth lens unit L5 and a distance between the fifth lens unit L5 and the sixth lens unit L6 may not be necessarily changed. Furthermore, the third lens unit L3 and the sixth lens unit L6 satisfy the conditions (1) and (3). The principal point position of the combined unit including the third lens unit L3 to the sixth lens unit L6 is moved toward the object side in the second region, and a high imaging magnification is obtained.

In addition, the third lens unit L3 and the fifth lens unit L5 satisfy the condition (2). The rear principal point position of the entire zoom lens is moved toward the image side at the wide-angle end in the first region, and the rear principal point position of the entire zoom lens is moved toward the object side at the macro end in the second region. Moreover, the amount of movement of the third lens unit L3 during macro driving from the telephoto end in the first region to the macro end in the second region satisfies the condition (4), so that the downsizing of the entire zoom lens and the providing of a high imaging magnification are achieved.

Furthermore, in the second exemplary embodiment, the first lens unit L1 is hardly moved during macro driving from the telephoto end to the macro end, and a working distance is decreased. However, a high imaging magnification can be easily achieved instead of this.

The third exemplary embodiment is a seven-unit zoom lens including, in order from the object side to the image side, the first lens unit L1 having positive refractive power, the second lens unit L2 having negative refractive power, the third lens unit L3 having positive refractive power, the fourth lens unit L4 having negative refractive power, the fifth lens unit L5 having positive refractive power, the sixth lens unit L6 having negative refractive power, and the seventh lens unit L7 having positive refractive power. The fifth lens unit L5 corresponds to the lens unit Lp having the highest positive refractive power. The sixth lens unit L6 and the seventh lens unit L7 correspond to the lens units Ln and Lp2.

The first region is the entire zooming range having a zoom ratio of 3.5, and the fifth lens unit L5 is moved toward the object side during zooming from the wide-angle end to the telephoto end. Each lens unit is moved during zooming in such a way that a distance between the first lens unit L1 and the second lens unit L2 is larger, a distance between the second lens unit L2 and the third lens unit L3 is smaller, a distance between the fifth lens unit L5 and the sixth lens unit L6 is larger, and a distance between the sixth lens unit L6 and the seventh lens unit L7 is smaller at the telephoto end than at the wide-angle end. The second lens unit L2 is moved toward the object side, so that focusing is performed from the infinite distance to a short distance. Thus, the rear principal point position of the entire zoom lens is effectively moved toward the object side, and a variable power effect is obtained.

Here, a distance between the third lens unit L3 and the fourth lens unit L4 and a distance between the fourth lens unit L4 and the fifth lens unit L5 may not be necessarily changed in the first region.

Focusing can be performed on an object at a shorter distance in the second region than in a range in which focusing can be performed in the first region. The maximum imaging magnification in the first region is a 0.17× magnification, whereas the maximum imaging magnification is a 0.6× magnification at the macro end in the second region.

The fifth lens unit L5 is moved toward the object side at the macro end than at the telephoto end. Moreover, a distance between the first lens unit L1 and the second lens unit L2 is smaller, a distance between the second lens unit L2 and the third lens unit L3 is larger, a distance between the third lens unit L3 and the fourth lens unit L4 is smaller, and a distance between the fourth lens unit L4 and the fifth lens unit L5 is larger at the macro end than at the telephoto end. The operation of each lens unit is similar to that in the first exemplary embodiment.

The fourth exemplary embodiment is a six-unit zoom lens including, in order from the object side to the image side, the first lens unit L1 having negative refractive power, the second lens unit L2 having positive refractive power, the third lens unit L3 having negative refractive power, the fourth lens unit L4 having positive refractive power, the fifth lens unit L5 having negative refractive power, and the sixth lens unit L6 having positive refractive power. The fourth lens unit L4 corresponds to the lens unit Lp having the highest positive refractive power. The fifth lens unit L5 corresponds to the lens unit Ln, and the sixth lens unit L6 corresponds to the lens unit Lp2.

The first region is the entire zooming range having a zoom ratio of 2.8, and the fourth lens unit L4 is moved toward the object side during zooming from the wide-angle end to the telephoto end. Each lens unit is moved during zooming in such a way that a distance between the first lens unit L1 and the second lens unit L2 is smaller, a distance between the fourth lens unit L4 and the fifth lens unit L5 is larger, and a distance between the fifth lens unit L5 and the sixth lens unit L6 is smaller at the telephoto end than at the wide-angle end. The first lens unit L1 is moved toward the object side during focusing from the infinite-distance object to a near-distance object. Thus, the rear principal point position of the entire zoom lens is effectively moved toward the object side, and a variable power effect is obtained.

In the first region, a distance between the second lens unit L2 and the third lens unit L3 and a distance between the third lens unit L3 and the fourth lens unit L4 may not be necessarily changed.

Focusing can be performed on an object at a shorter distance in the second region than in a range in which focusing can be performed in the first region. The maximum imaging magnification in the first region is a 0.17× magnification, whereas the maximum imaging magnification is a 0.6× magnification at the macro end in the second region.

The fourth lens unit L4 is moved toward the object side at the macro end in the second region compared with at the telephoto end in the first region, and a distance between the second lens unit L2 and the third lens unit L3 is smaller, and a distance between the third lens unit L3 and the fourth lens unit L4 is larger at the macro end in the second region than at the telephoto end in the first region. Here, a distance between the fourth lens unit L4 and the fifth lens unit L5 and a distance between the fifth lens unit L5 and the sixth lens unit L6 may not be necessarily changed in the second region.

Moreover, the fourth lens unit L4 and the sixth lens unit L6 satisfy the conditions (1) and (3). The principal point position of the combined unit including the fourth lens unit L4 to the sixth lens unit L6 is effectively moved toward the object side in the second region, and a high imaging magnification is implemented. Furthermore, the fourth lens unit L4 and the fifth lens unit L5 satisfy the condition (2). The rear principal point position of the entire zoom lens is effectively moved toward the image side at the wide-angle end in the first region, and the rear principal point position of the entire zoom lens is effectively moved toward the object side at the macro end in the second region.

In addition, the amount of movement of the fourth lens unit L4 satisfies the condition (4) during macro driving from the telephoto end to the macro end, so that the downsizing of the entire zoom lens and the providing of a high imaging magnification are implemented.

Part (b) in FIG. 7 illustrates a state in which focusing is performed on a predetermined finite distance in the first region at the telephoto end. Focusing can be continuously performed using the macro drive mechanism from a state in which the second lens unit L2 is positioned on the object side in part (b) in FIG. 7 to a state in which focusing is performed on a shortest distance at the macro end in the second region (the state corresponds to part (c) in FIG. 7). Moreover, the focusing operation using the macro drive mechanism from a state in which focusing is performed on a shortest distance at the macro end in the second region (part (c) in FIG. 7) to a state in which focusing is performed on an object at a predetermined finite distance at the telephoto end is inverse to the case described above.

Furthermore, such a configuration may be possible in which the operation of the macro drive mechanism is stopped and the focus drive mechanism is operated to move the first lens unit (the focus lens unit) L1 for adjusting focus.

The fifth exemplary embodiment is a seven-unit zoom lens including, in order from the object side to the image side, the first lens unit L1 having positive refractive power, the second lens unit L2 having negative refractive power, the third lens unit L3 having positive refractive power, the fourth lens unit L4 having negative refractive power, the fifth lens unit L5 having positive refractive power, the sixth lens unit L6 having negative refractive power, and the seventh lens unit L7 having positive refractive power. The fifth lens unit L5 corresponds to the lens unit Lp having the highest positive refractive power. The sixth lens unit L6 corresponds to the lens unit Ln, and the seventh lens unit L7 corresponds to the lens unit Lp2.

The first region is the entire zooming range having a zoom ratio of 2.8, and the fifth lens unit L5 is moved toward the object side during zooming from the wide-angle end to the telephoto end. Each lens unit is moved during zooming in such a way that a distance between the first lens unit L1 and the second lens unit L2 is larger, a distance between the second lens unit L2 and the third lens unit L3 is smaller, a distance between the fifth lens unit L5 and the sixth lens unit L6 is larger, and a distance between the sixth lens unit L6 and the seventh lens unit L7 is smaller at the telephoto end than at the wide-angle end. The second lens unit L2 is moved toward the object side, so that focusing is performed from an infinite-distance object to a near-distance object.

As described above, the rear principal point position of the entire zoom lens is effectively moved toward the object side, and a variable power effect is obtained. Moreover, the amount of movement for focusing is larger in the fifth exemplary embodiment because the fourth lens unit for focusing is not a lens unit having the highest negative power. However, the second lens unit L2 having the highest negative power is not a focus lens unit, so that a distance between the second lens unit L2 and the first lens unit L1 can be smaller at the wide-angle end, and the effective diameter of the first lens unit L1 can be decreased. Here, in the first region, a distance between the third lens unit L3 and the fourth lens unit L4 and a distance between the fourth lens unit L4 and the fifth lens unit L5 may not be necessarily changed during zooming.

Next, focusing can be performed on an object at a much shorter distance in the second region than in a range in which focusing can be performed in the first region. The maximum imaging magnification in the first region is a 0.18× magnification, whereas the maximum imaging magnification is a 0.8× magnification at the macro end in the second region.

Each lens unit is moved in such a way that the fifth lens unit L5 is moved toward the object side, a distance between the first lens unit L1 and the second lens unit L2 is smaller, a distance between the second lens unit L2 and the third lens unit L3 is larger, a distance between the third lens unit L3 and the fourth lens unit L4 is smaller, and a distance between the fourth lens unit L4 and the fifth lens unit L5 is larger at the macro end in the second region than at the telephoto end in the first region. Thus, the rear principal point position of the entire zoom lens is effectively moved toward the object side, and a high imaging magnification is implemented.

In the second region, a distance between the fifth lens unit L5 and the sixth lens unit L6 and a distance between the sixth lens unit L6 and the seventh lens unit L7 may not be necessarily changed. Moreover, the fifth lens unit L5 and the seventh lens unit L7 satisfy the conditions (1) and (3). The principal point position of the compound lens unit including the fifth lens unit L5 to the seventh lens unit L7 is effectively moved toward the object side in the second region, and a high imaging magnification is implemented.

Furthermore, the fifth lens unit L5 and the sixth lens unit L6 satisfy the condition (2). The rear principal point position of the entire zoom lens is effectively moved toward the image side at the wide-angle end in the first region, and the rear principal point position of the entire zoom lens is effectively moved toward the object side at the macro end in the second region. In addition, the amount of movement of the fifth lens unit L5 satisfies the condition (4) during macro driving from the telephoto end to the macro end, so that the downsizing of the entire zoom lens and the providing of a high imaging magnification are implemented.

Moreover, the first lens unit L1 is moved toward the image side during macro driving from the telephoto end to the macro end, and a working distance is effectively secured at the macro end.

Part (b) in FIG. 9 illustrates a state in which focusing is performed on a predetermined finite distance in the first region at the telephoto end. Focusing can be continuously performed using the macro drive mechanism from a state in which the second lens unit L2 is positioned on the object side in part (b) in FIG. 9 to a state in which focusing is performed on a shortest distance at the macro end in the second region (the state corresponds to part (c) in FIG. 9). Furthermore, the focusing operation using the macro drive mechanism from a state in which focusing is performed on a shortest distance at the macro end in the second region (part (c) in FIG. 9) to a state in which focusing is performed on an object at a predetermined finite distance at the telephoto end is inverse to the case described above.

In addition, such a configuration may be possible in which the operation of the macro drive mechanism is stopped and the focus drive mechanism is operated to move the second lens unit (the focus lens unit) L2 for adjusting focus.

The sixth exemplary embodiment is a five-unit zoom lens including, in order from the object side to the image side, the first lens unit L1 having positive refractive power, the second lens unit L2 having negative refractive power, the third lens unit L3 having positive refractive power, the fourth lens unit L4 having negative refractive power, and the fifth lens unit L5 having positive refractive power. The third lens unit L3 corresponds to the lens unit Lp having the highest positive refractive power. The fourth lens unit L4 corresponds to the lens unit Ln, and the fifth lens unit L5 corresponds to the lens unit Lp2.

The first region is the entire zooming range having a zoom ratio of 2.8, and the third lens unit L3 is moved toward the object side during zooming from the wide-angle end to the telephoto end. Each lens unit is moved during zooming in such a way that a distance between the first lens unit L1 and the second lens unit L2 is larger, a distance between the second lens unit L2 and the third lens unit L3 is smaller, a distance between the third lens unit L3 and the fourth lens unit L4 is larger, and a distance between the fourth lens unit L4 and the fifth lens unit L5 is smaller at the telephoto end than at the wide-angle end. The second lens unit L2 is moved toward the object side, so that focusing is performed from the infinite distance to a short distance. Thus, the rear principal point position of the entire zoom lens is effectively moved toward the object side, and a variable power effect is obtained.

Next, focusing can be performed on an object at a much shorter distance in the second region than in a range in which focusing can be performed in the first region. The maximum imaging magnification in the first region is a 0.15× magnification, whereas the maximum imaging magnification is a 0.6× magnification at the macro end in the second region. At the macro end in the second region, the third lens unit L3 is moved toward the object side more than at the telephoto end in the first region. Moreover, a distance between the first lens unit L1 and the second lens unit L2 is smaller, and a distance between the second lens unit L2 and the third lens unit L3 is larger at the macro end in the second region than at the telephoto end in the first region.

Here, in the second region, the third lens unit L3 and the fourth lens unit L4 and a distance between the fourth lens unit L4 and the fifth lens unit L5 may not be necessarily changed. Furthermore, the third lens unit L3 and the fifth lens unit L5 satisfy the conditions (1) and (3). The principal point position of the compound lens unit including the third lens unit L3 to the fifth lens unit L5 is effectively moved toward the object side in the second region, and a high imaging magnification is implemented.

In addition, the third lens unit L3 and the fourth lens unit L4 satisfy the condition (2). The rear principal point position of the entire zoom lens is effectively moved toward the image side at the wide-angle end in the first region, and the rear principal point position of the entire zoom lens is effectively moved toward the object side at the macro end in the second region. Moreover, the amount of movement of the third lens unit L3 satisfies the condition (4) during macro driving from the telephoto end to the macro end, so that the downsizing of the entire zoom lens and the providing of a high imaging magnification are implemented.

Furthermore, the first lens unit L1 is moved toward the image side during macro driving from the telephoto end to the macro end, and a working distance is effectively secured at the macro end. The reason why the value of a distance d is a negative value in the second region at a short distance, a middle distance, and a macro shortest distance in the numerical examples 1, 4, and 5 and at a macro shortest distance in the numerical example 6 is that the numerical examples express an infinite in-focus state for convenience.

Therefore, this means that it is not physically possible to perform focusing on the infinite distance in the second region of the numerical examples 1, 4, and 5. In other words, this means that the movement of the focus lens unit toward the infinite side is restricted and the subsequent positive lens unit is moved toward the object side.

Since the subsequent positive lens unit is moved toward the object side, the in-focus position is shifted to the close-up side, and spherical aberration is caused on the under side. Thus, in driving the focus lens unit toward the close-up side, spherical aberration on the over side is cancelled, and an excellent performance is obtained in the first region regardless of performing focusing on a shorter distance.

Actually, the focus lens unit is not located at the in-focus position of the infinite-distance object, and is located at a position moved toward the object side. Thus, since the lens unit on the image side of the focus lens unit is positioned in a space from which the focus lens unit is moved, the position of the lens unit is made to overlap a position at which the focus lens unit is to be located. As a result, the value of the distance d is a negative value by the amount of overlapping.

Next, the numerical examples 1 to 6 corresponding to the first to sixth exemplary embodiments are described. In the numerical examples, i is the order of surfaces from the object side. ri is the radius of curvature of the i-th surface, and di is a distance between the i-th surface and the (i+1)th surface. ndi is the refractive index of the material of each lens, and σdi is a value of the Abbe number of the material of each lens at the d-line ($\lambda$=587.6 nm). For a surface i on which the effective diameter is variable, an effective diameter is expressed as eai at each zoom position.

The total lens length is the length from the first lens surface to an image plane. BF is a back focus, and is the length from the last surface to the image plane. Moreover, K, A4, A6, A8, A10, and A12 are aspheric coefficients, and the shape of the aspheric surface is expressed by the following equation from a position X in the optical axis direction and a position H in a direction perpendicular to the optical axis, where the intersection point between the lens surface and the optical axis is an origin point, and a traveling direction of light is a positive direction.

$$X = \frac{(1/R)H^2}{1+\sqrt{1-(1+K)(H/R^2)}} + A4 \times H^4 + A6 \times H^6 + A8 \times H^8 + A10 \times H^{10} + A12 \times H^{12}$$

where R is a paraxial radius of curvature. Furthermore, "e-0X" means "×10$^{-X}$". "f" is a focal length, Fno is an F-number, and ω is a half angle of view. Furthermore, the portions where the distance d of each of the optical surfaces is expressed by "variable" are changed in the first region during zooming, or changed in performing focusing on an object at a short distance in the second region. The surface distances are listed in tables according to focal lengths. In addition, Table 1 lists the relationship between the above-described conditions and the numerical examples.

Numerical Example 1

| | Unit: mm | | | |
|---|---|---|---|---|
| | Surface data | | | |
| Surface number | r | d | nd | vd | Effective diameter |
| 1 | 244.270 | 2.00 | 1.84666 | 23.8 | 64.01 |
| 2 | 77.817 | 6.51 | 1.77250 | 49.6 | 60.60 |
| 3 | 520.807 | 0.15 | | | 59.92 |
| 4 | 54.708 | 5.10 | 1.83481 | 42.7 | 54.21 |
| 5 | 102.370 | (variable) | | | 52.93 |
| 6* | 106.449 | 1.80 | 1.80400 | 46.6 | 34.29 |
| 7 | 14.914 | 8.77 | | | 24.39 |
| 8 | −37.374 | 1.30 | 1.77250 | 49.6 | 23.98 |
| 9 | 29.028 | 0.15 | | | 23.30 |
| 10 | 27.566 | 5.50 | 1.80518 | 25.4 | 23.47 |
| 11 | −79.270 | (variable) | | | 23.25 |
| 12 | 33.816 | 3.47 | 1.62588 | 35.7 | 18.39 |
| 13 | −61.868 | (variable) | | | 18.48 |
| 14 | −31.637 | 1.00 | 1.84666 | 23.8 | 18.08 |
| 15 | −1969.479 | (variable) | | | 18.59 |
| 16 (stop) | ∞ | 2.00 | | | (variable) |
| 17 | 41.800 | 5.33 | 1.59282 | 68.6 | 20.52 |
| 18 | −37.861 | 0.15 | | | 20.66 |
| 19 | 50.346 | 5.96 | 1.49700 | 81.5 | 20.00 |
| 20 | −20.733 | 1.00 | 1.90366 | 31.3 | 19.21 |
| 21 | −50.842 | (variable) | | | 19.19 |
| 22 | −616.897 | 0.90 | 1.80100 | 35.0 | 15.94 |
| 23 | 20.095 | 2.57 | 1.84666 | 23.8 | 15.87 |
| 24 | 47.987 | (variable) | | | 15.88 |
| 25 | 267.996 | 2.77 | 1.85400 | 40.4 | 20.92 |
| 26* | −105.715 | | | | 21.61 |

-continued

Unit: mm

Aspheric surface data

Sixth surface

K = 0.00000e+000    A4 = 7.48366e-006    A6 = -9.07746e-009
A8 = -6.82116e-013  A10 = 1.96862e-014   A12 = -2.37851e-017

Twenty-sixth surface

K = 0.00000e+000    A4 = 1.23491e-005    A6 = -4.96603e-009
A8 = 2.44298e-010   A10 = -7.85907e-013

Various data
Zoom ratio 2.84

|  | First region | | | Second region | |
| --- | --- | --- | --- | --- | --- |
|  | Wide-angle | Middle | Telephoto | Short | Macro |
| Focal length | 24.30 | 35.10 | 69.00 | 67.23 | 60.62 |
| F-number | 4.10 | 4.10 | 4.10 | 5.28 | 5.56 |
| Half angle of view (degrees) | 41.68 | 31.65 | 17.41 | 17.84 | 19.64 |
| Image height | 21.64 | 21.64 | 21.64 | 21.64 | 21.64 |
| Total lens length | 134.65 | 141.04 | 164.94 | 162.09 | 152.75 |
| BF | 39.15 | 46.02 | 59.68 | 64.95 | 67.73 |
| d5 | 2.93 | 11.21 | 31.69 | 26.37 | 14.86 |
| d11 | 20.10 | 11.33 | 1.10 | -1.70 | -2.31 |
| d13 | 4.37 | 4.84 | 4.85 | 2.25 | 1.76 |
| d15 | 1.95 | 1.49 | 1.48 | 4.07 | 4.56 |
| d21 | 1.20 | 3.79 | 8.23 | 7.50 | 8.23 |
| d24 | 8.53 | 5.94 | 1.50 | 2.23 | 1.50 |
| ea16 | 13.30 | 15.16 | 19.19 | 15.43 | 15.21 |

Zoom lens unit data

| Unit | Start surface | Focal length | Lens configuration length | Front principal point position | Rear principal point position |
| --- | --- | --- | --- | --- | --- |
| 1 | 1 | 118.64 | 13.76 | 0.67 | -6.87 |
| 2 | 6 | -18.71 | 17.52 | 1.42 | -12.76 |
| 3 | 12 | 35.43 | 3.47 | 0.76 | -1.40 |
| 4 | 14 | -37.99 | 1.00 | -0.01 | -0.55 |
| 5 | 16 | 27.19 | 14.44 | 4.27 | -5.90 |
| 6 | 22 | -60.04 | 3.47 | 1.93 | 0.04 |
| 7 | 25 | 89.08 | 2.77 | 1.07 | -0.42 |

Numerical Example 2

Unit: mm

Surface data

| Surface number | r | d | nd | νd | Effective diameter |
| --- | --- | --- | --- | --- | --- |
| 1 | 263.908 | 2.00 | 1.84666 | 23.8 | 62.38 |
| 2 | 102.984 | 4.88 | 1.77250 | 49.6 | 59.16 |
| 3 | 432.623 | 0.15 |  |  | 58.45 |
| 4 | 47.920 | 5.69 | 1.77250 | 49.6 | 53.04 |
| 5 | 92.060 | (variable) |  |  | 51.75 |
| 6* | 83.302 | 1.50 | 1.88300 | 40.8 | 34.03 |
| 7 | 14.660 | 8.25 |  |  | 24.57 |
| 8 | -68.041 | 1.10 | 1.77250 | 49.6 | 24.23 |
| 9 | 32.879 | 0.15 |  |  | 23.36 |
| 10 | 25.387 | 7.22 | 1.74000 | 28.3 | 23.57 |
| 11 | -36.500 | 0.51 |  |  | 22.80 |
| 12 | -31.360 | 1.10 | 1.77250 | 49.6 | 22.53 |
| 13 | -106.222 | (variable) |  |  | 22.18 |
| 14 (stop) | ∞ | 2.00 |  |  | (variable) |
| 15 | 25.859 | 3.44 | 1.84666 | 23.8 | 19.13 |
| 16 | 495.764 | (variable) |  |  | 18.87 |
| 17 | -126.927 | 1.00 | 1.84666 | 23.8 | 18.52 |
| 18 | 15.691 | 6.98 | 1.49700 | 81.5 | 18.24 |
| 19 | -43.057 | 0.15 |  |  | 19.03 |
| 20 | 24.294 | 4.53 | 1.59282 | 68.6 | 19.59 |
| 21 | -69.931 | (variable) |  |  | 19.20 |
| 22 | -36.334 | 2.78 | 1.84666 | 23.8 | 17.01 |
| 23 | -17.718 | 0.90 | 1.61340 | 44.3 | 17.04 |
| 24 | 57.013 | (variable) |  |  | 17.00 |
| 25 | 1777.902 | 4.04 | 1.49700 | 81.5 | 18.84 |
| 26 | -27.300 | 0.15 |  |  | 19.56 |
| 27 | -72.953 | 1.40 | 1.85400 | 40.4 | 19.71 |
| 28* | 1270.014 |  |  |  | 20.15 |

Aspheric surface data

Sixth surface

K = 0.00000e+000    A4 = 5.42530e-006    A6 = -4.61658e-009
A8 = 1.31132e-012   A10 = 5.13380e-015

Twenty-eighth surface

K = 0.00000e+000    A4 = 2.06523e-005    A6 = 1.73814e-008
A8 = 2.94525e-010   A10 = -5.65490e-013

Various data
Zoom ratio 2.84

|  | Wide-angle | First region | | | Second region | |
| --- | --- | --- | --- | --- | --- | --- |
|  |  | Middle | Telephoto | Short | Macro | |
| Focal length | 24.30 | 35.00 | 68.99 | 64.84 | 66.22 |
| F-number | 4.10 | 4.10 | 4.10 | 5.20 | 5.83 |
| Half angle of view (degrees) | 41.68 | 31.72 | 17.41 | 18.45 | 18.09 |
| Image height | 21.64 | 21.64 | 21.64 | 21.64 | 21.64 |
| Total lens length | 133.45 | 137.89 | 161.03 | 159.82 | 158.68 |
| BF | 39.81 | 46.58 | 59.81 | 62.59 | 68.14 |
| d5 | 2.92 | 10.68 | 32.00 | 27.57 | 22.26 |
| d13 | 21.35 | 11.50 | 1.04 | 1.74 | 0.33 |
| d16 | 3.00 | 2.75 | 1.81 | 1.55 | 1.57 |
| d21 | 1.86 | 3.21 | 4.53 | 3.66 | 3.86 |
| d24 | 4.60 | 3.25 | 1.94 | 2.80 | 2.60 |
| ea14 | 13.38 | 14.79 | 17.54 | 14.01 | 13.28 |

Zoom lens unit data

| Unit | Start surface | Focal length | Lens configuration length | Front principal point position | Rear principal point position |
| --- | --- | --- | --- | --- | --- |
| 1 | 1 | 113.37 | 12.71 | -0.25 | -7.25 |
| 2 | 6 | -19.45 | 19.83 | 0.97 | -14.34 |
| 3 | 14 | 32.12 | 5.44 | 1.90 | -1.96 |
| 4 | 17 | 46.83 | 12.66 | 11.53 | 5.03 |
| 5 | 22 | -47.92 | 3.68 | 0.11 | -1.94 |
| 6 | 25 | 162.88 | 5.59 | 2.19 | -1.41 |

Numerical Example 3

Unit: mm

Surface data

| Surface number | r | d | nd | νd | Effective diameter |
| --- | --- | --- | --- | --- | --- |
| 1 | 198.785 | 2.00 | 1.84666 | 23.8 | 56.29 |
| 2 | 69.696 | 5.45 | 1.77250 | 49.6 | 51.45 |
| 3 | 359.221 | 0.15 |  |  | 50.06 |

-continued

Unit: mm

| Surface | r | d | nd | vd | Effective diameter |
|---|---|---|---|---|---|
| 4 | 46.783 | 4.42 | 1.77250 | 49.6 | 42.27 |
| 5 | 107.035 | (variable) | | | 41.19 |
| 6* | 113.860 | 1.60 | 1.88300 | 40.8 | 31.79 |
| 7 | 14.923 | 7.35 | | | 23.29 |
| 8 | −50.320 | 1.20 | 1.88300 | 40.8 | 22.94 |
| 9 | 30.250 | 0.15 | | | 22.23 |
| 10 | 27.615 | 6.31 | 1.80518 | 25.4 | 22.41 |
| 11 | −32.652 | 1.10 | 1.77250 | 49.6 | 22.23 |
| 12 | −102.403 | (variable) | | | 21.86 |
| 13 | 29.398 | 3.13 | 1.72047 | 34.7 | 16.90 |
| 14 | −82.282 | (variable) | | | 16.79 |
| 15 | −30.261 | 0.90 | 1.84666 | 23.8 | 15.95 |
| 16 | 917.764 | (variable) | | | 16.08 |
| 17 (stop) | ∞ | 1.50 | | | 16.54 |
| 18 | 52.353 | 3.48 | 1.59282 | 68.6 | 16.70 |
| 19 | −30.468 | 0.15 | | | 16.69 |
| 20 | 30.154 | 4.34 | 1.49700 | 81.5 | 15.85 |
| 21 | −23.115 | 0.90 | 1.90366 | 31.3 | 15.00 |
| 22 | −60.133 | (variable) | | | 14.72 |
| 23 | −299.625 | 0.80 | 1.83481 | 42.7 | 13.82 |
| 24 | 22.008 | 1.85 | 1.84666 | 23.8 | 13.30 |
| 25 | 38.425 | (variable) | | | 13.16 |
| 26 | 624.093 | 2.36 | 1.85400 | 40.4 | 17.14 |
| 27* | −162.823 | | | | 17.84 |

Aspheric surface data

Sixth surface

K = 0.00000e+000  A4 = 4.95365e−006  A6 = −7.83369e−009
A8 = 1.79042e−012  A10 = 2.63740e−014  A12 = −5.16279e−017

Twenty-seventh surface

K = 0.00000e+000  A4 = 1.92991e−005  A6 = 1.90581e−008
A8 = 3.02065e−010  A10 = −1.11865e−012

Various data
Zoom ratio 3.42

| | Wide-angle | First region | | Second region | |
|---|---|---|---|---|---|
| | | Middle | Telephoto | Short | Macro |
| Focal length | 24.30 | 35.10 | 82.99 | 68.22 | 64.03 |
| F-number | 3.58 | 4.42 | 5.89 | 5.92 | 5.87 |
| Half angle of view (degrees) | 41.68 | 31.65 | 14.61 | 17.60 | 18.67 |
| Image height | 21.64 | 21.64 | 21.64 | 21.64 | 21.64 |
| Total lens length | 126.64 | 128.32 | 155.92 | 149.57 | 148.58 |
| BF | 39.39 | 49.31 | 64.14 | 65.59 | 65.96 |
| d5 | 2.38 | 3.96 | 27.87 | 19.81 | 17.58 |
| d12 | 22.06 | 12.25 | 1.10 | 1.37 | 2.23 |
| d14 | 3.97 | 3.98 | 3.73 | 1.96 | 1.93 |
| d16 | 1.53 | 1.53 | 1.78 | 3.55 | 3.58 |
| d22 | 1.20 | 2.90 | 6.66 | 5.89 | 5.13 |
| d25 | 6.96 | 5.26 | 1.50 | 2.28 | 3.04 |

Zoom lens unit data

| Unit | Start surface | Focal length | Lens configuration length | Front principal point position | Rear principal point position |
|---|---|---|---|---|---|
| 1 | 1 | 94.77 | 12.01 | 1.24 | −5.48 |
| 2 | 6 | −16.73 | 17.71 | 1.20 | −12.38 |
| 3 | 13 | 30.42 | 3.13 | 0.48 | −1.36 |
| 4 | 15 | −34.59 | 0.90 | 0.02 | −0.47 |
| 5 | 17 | 22.76 | 10.37 | 3.21 | −4.06 |
| 6 | 23 | −41.06 | 2.65 | 1.29 | −0.14 |
| 7 | 26 | 151.42 | 2.36 | 1.01 | −0.26 |

Numerical Example 4

Unit: mm

Surface data

| Surface number | r | d | nd | vd | Effective diameter |
|---|---|---|---|---|---|
| 1* | 60.752 | 1.80 | 1.48749 | 70.2 | 39.59 |
| 2 | 16.615 | 10.98 | | | 29.43 |
| 3 | −62.412 | 1.30 | 1.80400 | 46.6 | 29.02 |
| 4 | 33.827 | 1.46 | | | 27.28 |
| 5 | 38.115 | 5.09 | 1.75520 | 27.5 | 27.47 |
| 6 | −163.919 | (variable) | | | 27.00 |
| 7 | 33.384 | 2.77 | 1.58313 | 59.4 | 18.13 |
| 8 | −134.419 | (variable) | | | 18.05 |
| 9 | −41.566 | 1.00 | 1.91082 | 35.3 | 17.84 |
| 10 | −10207.879 | (variable) | | | 18.06 |
| 11 (stop) | ∞ | 2.00 | | | 18.92 |
| 12 | 29.694 | 4.66 | 1.59282 | 68.6 | 20.39 |
| 13 | −50.762 | 0.15 | | | 20.31 |
| 14 | 30.222 | 4.87 | 1.49700 | 81.5 | 19.44 |
| 15 | −32.918 | 1.00 | 1.90366 | 31.3 | 18.61 |
| 16 | −168.309 | (variable) | | | 18.20 |
| 17 | 169.843 | 0.90 | 1.80100 | 35.0 | 13.84 |
| 18 | 15.404 | 2.42 | 1.84666 | 23.8 | 13.41 |
| 19 | 31.151 | (variable) | | | 13.34 |
| 20 | 242.197 | 2.20 | 1.85400 | 40.4 | 15.69 |
| 21* | −1299.657 | | | | 16.30 |

Aspheric surface data

First surface

K = 0.00000e+000  A4 = 7.98108e−006  A6 = 2.06752e−009
A8 = −2.22927e−012  A10 = 1.59653e−014  A12 = −1.90985e−018

Twenty-first surface

K = 0.00000e+000  A4 = 2.88036e−005  A6 = 5.42766e−008
A8 = 4.78099e−010  A10 = −2.33568e−012

Various data
Zoom ratio 2.84

| | Wide-angle | First region | | Second region | |
|---|---|---|---|---|---|
| | | Middle | Telephoto | Short | Macro |
| Focal length | 24.30 | 35.00 | 60.00 | 64.36 | 69.08 |
| F-number | 3.60 | 4.27 | 5.87 | 6.26 | 6.64 |
| Half angle of view (degrees) | 41.68 | 31.72 | 19.83 | 18.58 | 17.39 |
| Image height | 21.64 | 21.64 | 21.64 | 21.64 | 21.64 |
| Total lens length | 120.53 | 117.43 | 127.28 | 129.34 | 133.40 |
| BF | 39.61 | 49.44 | 72.30 | 77.31 | 82.31 |
| d6 | 27.04 | 14.11 | 1.10 | −1.85 | −2.80 |
| d8 | 3.07 | 3.79 | 3.79 | 1.85 | 1.86 |
| d10 | 2.22 | 1.50 | 1.50 | 3.44 | 3.42 |
| d16 | 1.20 | 2.35 | 4.49 | 4.27 | 4.20 |
| d19 | 4.79 | 3.64 | 1.50 | 1.72 | 1.79 |

Zoom lens unit data

| Unit | Start surface | Focal length | Lens configuration length | Front principal point position | Rear principal point position |
|---|---|---|---|---|---|
| 1 | 1 | −30.25 | 20.62 | 3.59 | −13.91 |
| 2 | 7 | 46.14 | 2.77 | 0.35 | −1.41 |
| 3 | 9 | −45.83 | 1.00 | −0.00 | −0.53 |
| 4 | 11 | 24.52 | 12.68 | 3.11 | −5.72 |
| 5 | 17 | −52.17 | 3.32 | 2.49 | 0.65 |
| 6 | 20 | 239.21 | 2.20 | 0.19 | −1.00 |

Numerical Example 5

Unit: mm

Surface data

| Surface number | r | d | nd | vd | Effective diameter |
|---|---|---|---|---|---|
| 1 | 230.276 | 2.10 | 1.84666 | 23.8 | 61.89 |
| 2 | 82.258 | 4.87 | 1.77250 | 49.6 | 56.85 |
| 3 | 241.484 | 0.15 | | | 55.45 |
| 4 | 53.998 | 5.22 | 1.77250 | 49.6 | 48.76 |
| 5 | 143.749 | (variable) | | | 47.66 |
| 6* | 87.658 | 1.90 | 1.77250 | 49.6 | 38.48 |
| 7 | 15.373 | 10.37 | | | 26.63 |
| 8 | −40.409 | 1.30 | 1.72000 | 50.2 | 26.20 |
| 9 | 31.051 | 0.15 | | | 25.33 |
| 10 | 29.379 | 5.51 | 1.80518 | 25.4 | 25.48 |
| 11 | −130.576 | (variable) | | | 25.07 |
| 12 | 39.119 | 2.82 | 1.69895 | 30.1 | 19.06 |
| 13 | −192.405 | (variable) | | | 19.12 |
| 14 | −40.172 | 1.00 | 1.84666 | 23.8 | 19.19 |
| 15 | 342.708 | (variable) | | | 19.72 |
| 16 (stop) | ∞ | 2.00 | | | (variable) |
| 17 | 33.216 | 5.57 | 1.59282 | 68.6 | 22.31 |
| 18 | −38.857 | 0.15 | | | 22.35 |
| 19 | 33.595 | 6.39 | 1.49700 | 81.5 | 21.16 |
| 20 | −24.200 | 1.00 | 1.90366 | 31.3 | 20.06 |
| 21 | −143.460 | (variable) | | | 19.68 |
| 22 | 429.899 | 0.90 | 1.80100 | 35.0 | 17.20 |
| 23 | 17.653 | 2.58 | 1.84666 | 23.8 | 16.55 |
| 24 | 43.631 | (variable) | | | 16.37 |
| 25 | 99.674 | 2.58 | 1.85400 | 40.4 | 18.65 |
| 26* | −429.347 | | | | 19.19 |

Aspheric surface data

Sixth surface

K = 0.00000e+000  A4 = 5.56364e−006  A6 = −6.07726e−009
A8 = 7.28646e−012  A10 = −6.28160e−015

Twenty-sixth surface

K = 0.00000e+000  A4 = 1.76755e−005  A6 = −2.39438e−008
A8 = 6.64573e−010  A10 = −2.91200e−012

Various data
Zoom ratio 2.84

| Focal length | 24.30 | 35.10 | 69.00 | 63.64 | 59.41 |
|---|---|---|---|---|---|
| F-number | 4.10 | 4.10 | 4.10 | 5.32 | 5.86 |
| Half angle of view (degrees) | 41.68 | 31.65 | 17.41 | 18.78 | 20.01 |
| Image height | 21.64 | 21.64 | 21.64 | 21.64 | 21.64 |
| Total lens length | 133.55 | 134.87 | 162.69 | 157.85 | 155.03 |
| BF | 39.55 | 49.91 | 63.96 | 76.00 | 76.74 |
| d5 | 0.90 | 2.58 | 26.25 | 7.44 | 1.20 |
| d11 | 21.71 | 10.99 | 1.10 | 3.03 | 5.70 |
| d13 | 4.87 | 5.55 | 5.55 | 8.30 | 10.16 |
| d15 | 2.18 | 1.50 | 1.50 | −1.25 | −3.11 |
| d21 | 1.20 | 3.24 | 6.07 | 5.92 | 5.49 |
| d24 | 6.58 | 4.54 | 1.71 | 1.86 | 2.29 |
| ea16 | 13.67 | 16.38 | 20.39 | 17.82 | 16.16 |

Zoom lens unit data

| Unit | Start surface | Focal length | Lens configuration length | Front principal point position | Rear principal point position |
|---|---|---|---|---|---|
| 1 | 1 | 115.44 | 12.34 | 0.86 | −6.04 |
| 2 | 6 | −20.27 | 19.22 | 2.08 | −13.42 |
| 3 | 12 | 46.75 | 2.82 | 0.28 | −1.38 |
| 4 | 14 | −42.42 | 1.00 | 0.06 | −0.48 |
| 5 | 16 | 26.25 | 15.10 | 2.85 | −7.37 |
| 6 | 22 | −67.48 | 3.48 | 2.40 | 0.48 |
| 7 | 25 | 94.94 | 2.58 | 0.26 | −1.13 |

Numerical Example 6

Unit: mm

Surface data

| Surface number | r | d | nd | vd | Effective diameter |
|---|---|---|---|---|---|
| 1 | 247.963 | 2.00 | 1.84666 | 23.8 | 62.84 |
| 2 | 94.107 | 6.23 | 1.77250 | 49.6 | 59.33 |
| 3 | 2535.470 | 0.15 | | | 58.16 |
| 4 | 56.515 | 4.28 | 1.77250 | 49.6 | 51.55 |
| 5 | 96.425 | (variable) | | | 50.36 |
| 6* | 68.384 | 1.50 | 1.83481 | 42.7 | 33.02 |
| 7 | 14.938 | 8.18 | | | 24.15 |
| 8 | −43.297 | 1.10 | 1.77250 | 49.6 | 23.77 |
| 9 | 29.027 | 0.15 | | | 22.57 |
| 10 | 26.172 | 6.88 | 1.74000 | 28.3 | 22.68 |
| 11 | −33.102 | 0.65 | | | 22.01 |
| 12 | −26.759 | 1.10 | 1.77250 | 49.6 | 21.70 |
| 13 | −57.409 | (variable) | | | 21.33 |
| 14 (stop) | ∞ | 2.00 | | | (variable) |
| 15 | 21.901 | 3.31 | 1.84666 | 23.8 | 20.12 |
| 16 | 59.010 | 2.07 | | | 19.73 |
| 17 | 142.689 | 1.00 | 1.84666 | 23.8 | 19.49 |
| 18 | 15.173 | 7.18 | 1.49700 | 81.5 | 18.93 |
| 19 | −53.709 | 0.15 | | | 19.52 |
| 20 | 24.378 | 4.19 | 1.59282 | 68.6 | 19.90 |
| 21 | −167.436 | (variable) | | | 19.44 |
| 22 | −36.741 | 2.60 | 1.84666 | 23.8 | 17.01 |
| 23 | −18.117 | 0.90 | 1.61340 | 44.3 | 16.96 |
| 24 | 62.501 | (variable) | | | 16.58 |
| 25* | 259.761 | 6.10 | 1.58313 | 59.4 | 21.63 |
| 26 | −17.957 | 1.10 | 1.91082 | 35.3 | 22.51 |
| 27 | −35.475 | | | | 24.22 |

Aspheric surface data

Sixth surface

K = 0.00000e+000  A4 = 5.29974e−006  A6 = −4.47970e−009
A8 = −6.03868e−012  A10 = 1.74504e−014

Twenty-fifth surface

K = 0.00000e+000  A4 = −1.78262e−005  A6 = −4.57943e−009
A8 = −2.59388e−010  A10 = 4.39480e−013

Various data
Zoom ratio 2.75

| Focal length | 24.70 | 35.00 | 68.00 | 52.69 | 61.07 |
|---|---|---|---|---|---|
| F-number | 4.00 | 4.10 | 4.10 | 5.18 | 5.80 |
| Half angle of view (degrees) | 41.22 | 31.72 | 17.65 | 22.32 | 19.51 |
| Image height | 21.64 | 21.64 | 21.64 | 21.64 | 21.64 |
| Total lens length | 135.95 | 142.83 | 168.21 | 149.36 | 156.88 |
| BF | 39.00 | 46.61 | 61.07 | 68.32 | 76.67 |
| d5 | 2.84 | 10.83 | 32.00 | 5.56 | 6.84 |
| d13 | 19.67 | 10.94 | 0.70 | 1.03 | −1.08 |
| d21 | 2.13 | 3.36 | 5.71 | 4.99 | 5.40 |
| d24 | 9.49 | 8.26 | 5.91 | 6.63 | 6.22 |
| ea14 | 13.92 | 15.04 | 18.02 | 15.05 | 14.52 |

Zoom lens unit data

| Unit | Start surface | Focal length | Lens configuration length | Front principal point position | Rear principal point position |
|---|---|---|---|---|---|
| 1 | 1 | 121.70 | 12.66 | 0.79 | −6.26 |
| 2 | 6 | −19.05 | 19.57 | 1.58 | −13.70 |
| 3 | 14 | 24.80 | 19.90 | 8.66 | −7.23 |
| 4 | 22 | −50.16 | 3.50 | 0.05 | −1.90 |
| 5 | 25 | 101.62 | 7.20 | 4.51 | 0.05 |

TABLE 1

|  |  | Numerical Example 1 | Numerical Example 2 | Numerical Example 3 |
|---|---|---|---|---|
| Conditions | Lens Type | Positive, Negative, Positive, Negative, Positive, Negative, and Positive | Positive, Negative, Positive, Positive, Negative, and Positive | Positive, Negative, Positive, Negative, Positive, Negative, and Positive |
|  | Focus Unit | Second Lens Unit | Second Lens Unit | Second Lens Unit |
|  | fw | 24.301 | 24.302 | 24.298 |
|  | ft | 68.999 | 68.988 | 82.990 |
|  | $F_{Lp}$ | 27.188 | 32.115 | 22.764 |
|  | $F_{Ln}$ | −60.040 | −47.918 | −41.055 |
|  | $F_{Ln2}$ | 89.075 | 162.877 | 151.419 |
|  | o1Lp | 0.754 | 4.502 | −2.806 |
|  | BLDLp | 29.668 | 33.401 | 22.041 |
|  | mLp | −7.640 | −9.351 | −1.583 |
|  | TLDw | 136.012 | 135.010 | 128.006 |
|  | βm | −0.700 | −0.600 | −0.597 |
| (1) | $F_{Lp}/F_{Lp2}$ | 0.305 | 0.197 | 0.150 |
| (2) | $-F_{Lp}/F_{Ln}$ | 0.453 | 0.670 | 0.554 |
| (3) | o1Lp/BLDLp | 0.025 | 0.135 | −0.127 |
| (4) | mLp/TLDw/βm | 0.080 | 0.115 | 0.021 |

|  |  | Numerical Example 4 | Numerical Example 5 | Numerical Example 6 |
|---|---|---|---|---|
| Conditions | Lens Type | Negative, Positive, Negative, Positive, Negative, and Positive | Positive, Negative, Positive, Negative, Positive, Negative, and Positive | Positive, Negative, Positive, Negative, and Positive |
|  | Focus Unit | First Lens Unit | Fourth Lens Unit | Second Lens Unit |
|  | fw | 24.286 | 24.300 | 24.700 |
|  | ft | 59.945 | 69.000 | 67.995 |
|  | $F_{Lp}$ | 24.768 | 26.246 | 24.805 |
|  | $F_{Ln}$ | −52.171 | −67.482 | −50.159 |
|  | $F_{Ln2}$ | 149.913 | 94.937 | 101.623 |
|  | o1Lp | −3.812 | −0.235 | 7.537 |
|  | BLDLp | 21.978 | 26.953 | 40.220 |
|  | mLp | −4.425 | −12.391 | −15.330 |
|  | TLDw | 130.037 | 135.000 | 137.518 |
|  | βm | −0.574 | −0.799 | −0.586 |
| (1) | $F_{Lp}/F_{Lp2}$ | 0.165 | 0.276 | 0.244 |
| (2) | $-F_{Lp}/F_{Ln}$ | 0.475 | 0.389 | 0.495 |
| (3) | o1Lp/BLDLp | −0.173 | −0.009 | 0.187 |
| (4) | mLp/TLDw/βm | 0.059 | 0.115 | 0.190 |

Next, an exemplary embodiment in which the zoom lenses described in the first to the sixth exemplary embodiments are applied to an image pickup apparatus will be described with reference to FIG. 13. An image pickup apparatus according to an exemplary embodiment of the present invention includes an interchangeable lens device including a zoom lens, and a camera body detachably attached to the interchangeable lens device via a camera mount unit and including an image sensor that receives an optical image formed by the zoom lens and converts the optical image into electrical image signals.

FIG. 13 is a schematic diagram of main components of a single-lens reflex camera. In FIG. 13, a photographic lens 10 includes a zoom lens 1 according to the first to the sixth exemplary embodiments. The zoom lens 1 is held on a lens barrel 2, which is a holding member. A camera body 20 includes a quick-return mirror 3 that reflects a light flux from the photographic lens 10 upward and a focusing screen 4 disposed at an image forming position of the photographic lens 10. The camera body 20 further includes a pentagonal roof prism 5 that converts a reverse image formed on the focusing screen 4 into an erect image, an eyepiece lens 6 that is used to observe the erect image, and other components.

On a photosensitive surface 7, a solid-state image sensor (a photoelectric conversion element) that receives an image formed by a zoom lens, such as a CCD sensor and CMOS sensor, or a silver-halide film is disposed. In shooting an object, the quick-return mirror 3 is retracted out of an optical path, and an image is formed on the photosensitive surface 7 through the photographic lens 10. The advantages described in the first to the sixth exemplary embodiments are effectively exerted on an image pickup apparatus discussed in the exemplary embodiment.

The exemplary embodiment is similarly applicable to a mirrorless single-lens reflex camera with no quick-return mirror 3 for an image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153685 filed Jul. 9, 2012, which is hereby incorporated by reference herein in its entirety.

What is claimed is:

1. A zoom lens comprising, in order from an object side to an image side:

a lens unit Lp having the highest positive refractive power among all lens units included in the zoom lens, a lens unit Ln having negative refractive power, and a lens unit Lp2 having positive refractive power, wherein a distance between every adjacent lens units varying during zooming, wherein in a first region in which focusing from an infinite distance to a predetermined finite distance and zooming are able to be performed, two or more lens units are moved during zooming, and at least one lens unit is moved during focusing, and wherein in a second region in which macro driving is performed from a telephoto end to a macro end at which focusing is able to be performed on an object distance shorter than the predetermined finite distance, two or more lens units are moved during macro driving so that the lens unit Lp is located closer to the object side than at a wide-angle end, a distance between the lens unit Lp and the lens unit Ln is larger at the macro end than at the wide-angle end, and a distance between the lens unit Ln and the lens unit Lp2 is smaller at the macro end than at the wide-angle end.

2. The zoom lens according to claim 1, wherein during focusing in the second region, a lens unit to be moved during focusing in the first region is moved.

3. The zoom lens according to claim 1, wherein the following condition is satisfied:

$$0.05 < FLP/FLP2 < 0.60,$$

where a focal length of the lens unit Lp is FLP, and a focal length of the lens unit Lp2 is FLP2.

4. The zoom lens according to claim 1, wherein the following condition is satisfied:

$$0.20 < |FLP/FLn| < 0.90,$$

where a focal length of the lens unit Ln is FLn, and a focal length of the lens unit Lp is FLP.

5. The zoom lens according to claim 1, wherein the following condition is satisfied:

$$-0.30 < o1LP/BldLP < 0.40,$$

where a distance on an optical axis from a lens surface of the lens unit Lp on the object side to a front principal point position of a partial system including the lens unit Lp to the lens unit Lp2 at the macro end in the second region is o1LP, and a distance on the optical axis from a lens surface of the lens unit Lp on the object side to a lens surface of the lens unit Lp2 on the image side at the macro end in the second region is B1dLP.

6. The zoom lens according to claim 1, wherein the following condition is satisfied:

$$0.01 < (mLp/TLDw)/\beta m < 0.40,$$

where an amount of movement of the lens unit Lp when the lens unit Lp is moved from the telephoto end to the macro end is mLp, a total lens length at the wide-angle end is TLDw, and an imaging magnification when focusing is performed on an object at a shortest distance at the macro end is βm.

7. The zoom lens according to claim 1, further comprising, in order from the object side to the image side, a first lens unit having positive refractive power and a second lens unit having negative refractive power in addition to a partial system including the lens unit Lp to the lens unit Lp2,
wherein a distance between the first lens unit and the second lens unit is larger at the telephoto end than at the wide-angle end.

8. The zoom lens according to claim 7, wherein during macro driving from the telephoto end to the macro end, the first lens unit is moved toward the image side.

9. The zoom lens according to claim 1, further comprising a first lens unit having negative refractive power disposed closest to the object side.

10. The zoom lens according to claim 1, wherein a lens unit to be moved during focusing in the first region is a lens unit having the highest negative refractive power.

11. The zoom lens according to claim 10, wherein a position of a lens unit in an optical axis direction to be moved during focusing when focusing is performed on an infinite-distance object at the telephoto end and a position of a lens unit in the optical axis direction adjacent to the image side of the lens unit overlap each other in a part of the second region.

12. The zoom lens according to claim 1, wherein the lens unit Lp and the lens unit Lp2 are integrally moved during zooming.

13. The zoom lens according to claim 1, wherein the zoom lens includes, in order from the object side to the image side, a first lens unit having positive refractive power, a second lens unit having negative refractive power, a third lens unit having positive refractive power, a fourth lens unit having negative refractive power, a fifth lens unit having positive refractive power, a sixth lens unit having negative refractive power, and a seventh lens unit having positive refractive power,
wherein each lens unit is moved during zooming so that a distance between every adjacent lens units varies, and
wherein the fifth lens unit is the lens unit Lp, the sixth lens unit is the lens unit Ln, and the seventh lens unit is the lens unit Lp2.

14. The zoom lens according to claim 1, wherein the zoom lens includes, in order from the object side to the image side, a first lens unit having positive refractive power, a second lens unit having negative refractive power, a third lens unit having positive refractive power, a fourth lens unit having positive refractive power, a fifth lens unit having negative refractive power, and a sixth lens unit having positive refractive power,
wherein each lens unit is moved during zooming so that a distance between every adjacent lens units varies, and
wherein the third lens unit is the lens unit Lp, the fifth lens unit is the lens unit Ln, and the sixth lens unit is the lens unit Lp2.

15. The zoom lens according to claim 1, wherein the zoom lens includes, in order from the object side to the image side, a first lens unit having negative refractive power, a second lens unit having positive refractive power, a third lens unit having negative refractive power, a fourth lens unit having positive refractive power, a fifth lens unit having negative refractive power, and a sixth lens unit having positive refractive power,
wherein each lens unit is moved during zooming so that a distance between every adjacent lens units varies, and
wherein the fourth lens unit is the lens unit Lp, the fifth lens unit is the lens unit Ln, and the sixth lens unit is the lens unit Lp2.

16. The zoom lens according to claim 1, wherein the zoom lens includes, in order from the object side to the image side, a first lens unit having positive refractive power, a second lens unit having negative refractive power, a third lens unit having positive refractive power, a fourth lens unit having negative refractive power, and a fifth lens unit having positive refractive power,
wherein each lens unit is moved during zooming so that a distance between every adjacent lens units varies, and
wherein the third lens unit is the lens unit Lp, the fourth lens unit is the lens unit Ln, and the fifth lens unit is the lens unit Lp2.

17. An image pickup apparatus comprising:
a zoom lens and a solid-state image sensor configured to receive an image formed by the zoom lens,
wherein the zoom lens includes, in order from an object side to an image side, a lens unit Lp having the highest positive refractive power among all lens units included in the zoom lens, a lens unit Ln having negative refractive power, and a lens unit Lp2 having positive refractive power,
wherein a distance between every adjacent lens units varies during zooming,
wherein in a first region in which focusing from an infinite distance to a predetermined finite distance and zooming are able to be performed, two or more lens units are moved during zooming, and at least one lens unit is moved during focusing, and
wherein in a second region in which macro driving is performed from a telephoto end to a macro end at which focusing is able to be performed on an object distance shorter than a predetermined finite distance, two or more lens units are moved during macro driving so that the lens unit Lp is located closer to the object side than at a wide-angle end, a distance between the lens unit Lp and the lens unit Ln is larger at the macro end than at the wide-angle end, and a distance between the lens unit Ln and the lens unit Lp2 is smaller at the macro end than at the wide-angle end.

* * * * *